United States Patent [19]

Allen

[11] Patent Number: 6,164,847
[45] Date of Patent: Dec. 26, 2000

[54] IMAGING PARAMETER DETECTION

[75] Inventor: Roy D. Allen, Burlington, Mass.

[73] Assignee: Agfa Corporation, Wilmington, Mass.

[21] Appl. No.: 09/393,237

[22] Filed: Sep. 9, 1999

Related U.S. Application Data

[63] Continuation-in-part of application No. 09/167,027, Oct. 6, 1998, which is a continuation of application No. 08/789,812, Jan. 28, 1997, Pat. No. 5,857,784.
[60] Provisional application No. 60/099,881, Sep. 11, 1998.

[51] Int. Cl.$^7$ ........................................................ B41J 3/42
[52] U.S. Cl. ........................................................ 400/74
[58] Field of Search ................................................. 400/74

[56] References Cited

U.S. PATENT DOCUMENTS

| | | |
|---|---|---|
| 4,032,978 | 6/1977 | Wong ........................................ 358/283 |
| 4,183,990 | 1/1980 | Uchida et al. . |
| 4,273,045 | 6/1981 | Crowley . |
| 4,419,426 | 12/1983 | Kehl . |
| 4,504,141 | 3/1985 | Yamakoshi . |
| 4,532,596 | 7/1985 | Pugsley . |
| 4,534,288 | 8/1985 | Brovman . |
| 4,546,700 | 10/1985 | Kishner et al. . |
| 4,588,298 | 5/1986 | Nakamura . |
| 4,679,071 | 7/1987 | Kitagawa . |
| 4,913,049 | 4/1990 | Sainio . |
| 5,056,430 | 10/1991 | Bayerlein et al. . |
| 5,138,667 | 8/1992 | Roch et al. . |
| 5,160,845 | 11/1992 | Stumbo et al. . |
| 5,227,815 | 7/1993 | Dastin et al. . |
| 5,237,394 | 8/1993 | Eaton . |
| 5,434,604 | 7/1995 | Cleary et al. . |
| 5,493,321 | 2/1996 | Zwaldo . |
| 5,530,460 | 6/1996 | Wehl . |
| 5,548,418 | 8/1996 | Gaynor et al. ............................. 359/20 |
| 5,857,784 | 1/1999 | Allen . |

OTHER PUBLICATIONS

R. Levien, "Highly sensitive register mark based on moire patterns", Color Hard Copy and Graphics Arts II, SPIE Proceedings Series, vol. 1912, pp. 423–427, Feb.1993.

*Primary Examiner*—John S. Hilten
*Assistant Examiner*—Charles H. Nolan, Jr.
*Attorney, Agent, or Firm*—Ira V. Heffran

[57] ABSTRACT

A system and method for detecting imaging parameters includes forming a first image generated with pseudorandom noise and a second image generated with the same pseudorandom noise that serve as an imaging parameter sensor when the first and second images are superimposed. The sensor is useful for visually detecting such imaging parameters such as geometric errors. In one embodiment, the first and second patterns are generated with pseudorandom noise by modulating a repetitive pattern with pseudorandom noise. In another embodiment, the first and second patterns are generated with pseudorandom noise by forming a pseudorandom image and the reverse of the image, and phase shifting one or both of the images.

32 Claims, 19 Drawing Sheets

SYMBOL

MASK

0 PIX

+1 PIX

+2 PIX

+3 PIX

+4 PIX

+5 PIX

+6 PIX

SYMBOL

MASK

0 PIX

+1 PIX

+2 PIX

+3 PIX

+4 PIX

+5 PIX

+6 PIX

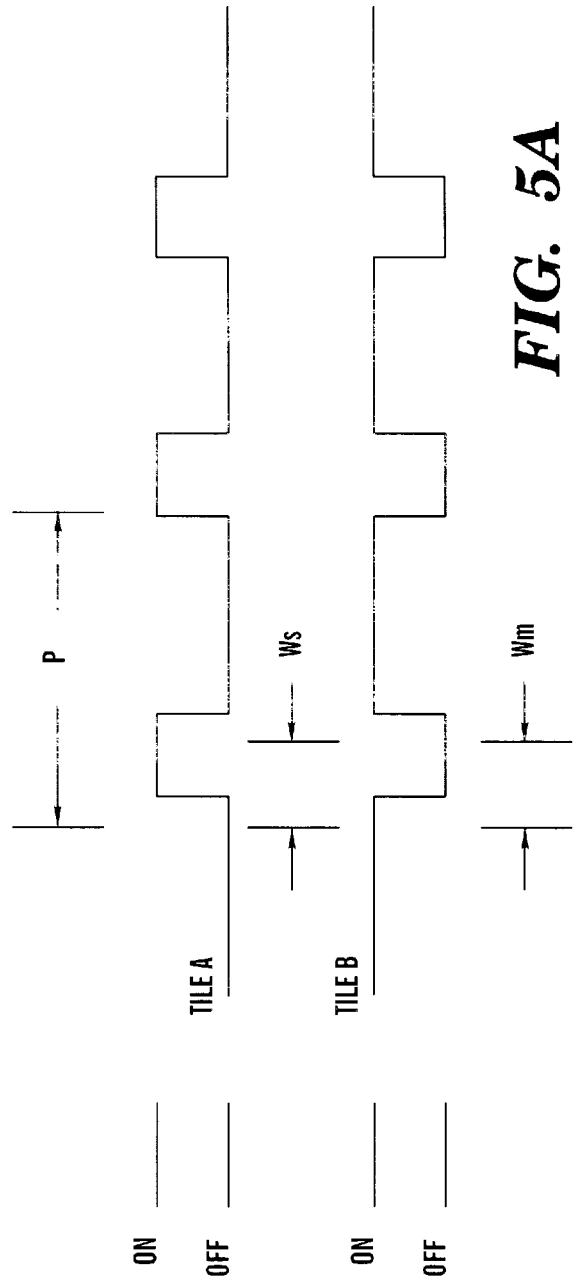

SYMBOL TILE 'A'

SYMBOL TILE 'B'

0 PIX

+1 PIX

+2 PIX

+3 PIX

+4 PIX

+5 PIX

+6 PIX

SYMBOL TILE 'A'

SYMBOL TILE 'B'

0 PIX

+1 PIX

+2 PIX

+3 PIX

+4 PIX

+5 PIX

+6 PIX

| CELL AA X:-3 Y:+3 | CELL AB X:-2 Y:+3 | CELL AC X:-1 Y:+3 | CELL AD X:0 Y:+3 | CELL AE X:+1 Y:+3 | CELL AF X:+2 Y:+3 | CELL AG X:+3 Y:+3 |
|---|---|---|---|---|---|---|
| CELL BA X:-3 Y:+2 | CELL BB X:-2 Y:+2 | CELL BC X:-1 Y:+2 | CELL BD X:0 Y:+2 | CELL BE X:+1 Y:+2 | CELL BF X:+2 Y:+2 | CELL BG X:+3 Y:+2 |
| CELL CA X:-3 Y:+1 | CELL CB X:-2 Y:+1 | CELL CC X:-1 Y:+1 | CELL CD X:0 Y:+1 | CELL CE X:+1 Y:+1 | CELL CF X:+2 Y:+1 | CELL CG X:+3 Y:+1 |
| CELL DA X:-3 Y:+0 | CELL DB X:-2 Y:+0 | CELL DC X:-1 Y:+0 | CELL DD X:0 Y:+0 | CELL DE X:+1 Y:+0 | CELL DF X:+2 Y:+0 | CELL DG X:+3 Y:+0 |
| CELL EA X:-3 Y:-1 | CELL EB X:-2 Y:-1 | CELL EC X:-1 Y:-1 | CELL ED X:0 Y:-1 | CELL EE X:+1 Y:-1 | CELL EF X:+2 Y:-1 | CELL EG X:+3 Y:-1 |
| CELL FA X:-3 Y:-2 | CELL FB X:-2 Y:-2 | CELL FC X:-1 Y:-2 | CELL FD X:0 Y:-2 | CELL FE X:+1 Y:-2 | CELL FF X:+2 Y:-2 | CELL FG X:+3 Y:-2 |
| CELL GA X:-3 Y:-3 | CELL GB X:-2 Y:-3 | CELL GC X:-1 Y:-3 | CELL GD X:0 Y:-3 | CELL GE X:+1 Y:-3 | CELL GF X:+2 Y:-3 | CELL GG X:+3 Y:-3 |

*FIG. 8*

TILE A

TILE B

IMAGING PARAMETER DETECTION

CROSS-REFERENCE TO RELATED APPLICATIONS

This is a continuation-in-part of U.S. patent application Ser. No. 09/167,027 filed Oct. 6, 1998, which is a continuation of serial number U.S. patent application Ser. No. 08/789,812, filed Jan. 28, 1997, now U.S. Pat. No. 5,857,784, and this application claims priority to U.S. Provisional Patent Application Ser. No. 60/099,881, filed Sep. 11, 1998.

TECHNICAL FIELD

This invention relates to electronic imaging systems, and more particularly to providing detection of imaging parameters.

BACKGROUND INFORMATION

Modern electronic prepress, offset and other types of printing operations write or record images for subsequent reproduction or read a prerecorded image at a predefined resolution rate. Such systems may write or record images or in the case of prepress systems, read prerecorded images on various media including, photo or thermal sensitive paper or polymer films, photo or thermal sensitive coatings, erasable imaging materials or ink receptive media mounted onto an image recording surface, or photo or thermal sensitive paper, polymer film or aluminum base printing plate materials, all used in image reproduction. Such media are mounted onto a recording surface which may be planar or curved.

In the case of prepress systems, the primary components include a recording surface, usually a drum cylinder and a scan mechanism disposed and movable within the drum cylinder. The system also includes a processor, with an associated storage device, for controlling the scanning mechanism. The processor and associated storage device may be housed within the system itself or separate from the system with appropriate interconnection to the system. The processor, in accordance with stored programming instructions, controls the scanning mechanism to write or read images on the medium mounted to the inner drum cylinder wall by scanning one or more optical beams over the inside circumference of the drum cylinder while the drum cylinder itself remains fixed.

The scanning and hence the recording are performed over only a portion of the cylinder inner circumference, typically between 120° and 320° of the circumference of the drum cylinder. The optical beam(s) are typically emitted so as to be parallel with a central axis of the cylinder and are deflected by, for example, a spinning mirror, Hologon or Penta-prism deflector so as to form a single scan line or multiple scan lines which simultaneously impinge upon the recording surface. The deflector is spun or rotated by a motor about an axis of rotation substantially coincident with the central axis of the drum cylinder. To increase the recording speed, the speed of rotation of the beam deflecting device can be increased.

Notwithstanding the type of system, whether prepress, offset printing or otherwise, being utilized, it is of primary importance that the images be recorded as close as possible to a desired location to ensure that appropriately positioned images are formed on the recording surface and hence the desired image is properly recorded. For example, in prepress systems, a synchronization error or beam printing error in a scan engine, a media positioning error, or other types of anomalies will cause errors in the positioning of the image on the medium. In offset printing type systems, misalignment of the plates forming a multiple plate image or of the paper feed or other anomalies will similarly cause image position errors which manifest themselves as a positioning error between respective images.

Often in prepress or printing operations, it is required that the same image be recorded numerous times in a precise location on the same or different sheets of media. In such cases, it is imperative that the image be repeatable within a tight position tolerance, e.g. less than a mil, on each sheet. If an anomaly exists in scan mechanism or emitter of a prepress or the rollers or feed of an offset printer, the images will not be properly positioned on each of the sheets of media and the result will be unacceptable. Errors of this type are commonly characterized as registration errors.

In image setting operations, it is customary for the positional repeatability to be verified with the media held stationary, to within a specified tolerance in two axes by repetitively exposing a test page containing fiducial marks, e.g. cross hairs, with a line image in multiple exposure fashion to form a register or registration mark which simulates multiple separate full sheet exposures. At each cross hair location, the x-y position error over the multiple exposures is estimated using a magnifying lens, e.g. a microscope, to detect the deviation between the centers of the overlaid images.

Because the minimum line width, i.e., a single pixel, of the image setter is typically much larger than the repeatability errors which must be measured, resolution of the position error measurement even with a microscope is compromised using the conventional approach. Also, by exposing multiple single pixel lines on top of each other, blooming of the exposed lines will occur and significantly increase the thickness of the line so as to further compromise the measurement resolution. Blooming may be reduced by lowering the individual exposure levels of the single pixel lines; however, this tends to result in a loss of images for a first number of exposures because there is insufficient energy for the respective exposures to create a visible mark on the media when the exposure level is lowered enough to eliminate the blooming effects. The loss of the initial images is yet another form of measurement resolution loss.

Additionally, single pixel lines are susceptible to transient position errors caused, for example, by random wobble. Such transient position errors may be interpreted to mean that positional repeatability is unacceptable when, in fact, statistically the errors may not represent the overall repeatability within a given area, such as the area of a halftone dot. On the other hand, if the line width is increased to several pixels to increase visibility, and provide a better statistical representation of the overall repeatability, it becomes much more difficult to detect misalignments, which often exceed the position error tolerance by an amount much less than the width of the line. Further still, using the conventional technique, variables such as media response, spot size, exposure setting, media processing, etc., may significantly affect the ability to detect repeatability errors because these variables will have a greater impact on the results obtained using conventional techniques than the actual position error to be detected.

More sophisticated techniques for detecting repeatability errors have been proposed which overcome at least some of the difficulties in the conventional approach. For example, one proposal is to use a highly sensitive moire pattern formed by superpositioning two separate patterns having slightly different spatial frequencies to serve as the register mark. When the patterns are properly aligned, a bright spot appears in the center of the register mark. However, when the patterns are misaligned, the bright spot is visually displaced. The resulting interference pattern has smooth density transitions between input and dark nodes the present a soft density transition to the eye making it difficult to identify subtle pattern changes. Although improving a viewer's ability to visually perceive a misalignment between the patterns, small misalignment errors remain difficult if not impossible to detect with the unaided eye or even a microscope. Further, the technique does not provide a way to quantify the extent or degree, i.e., the magnitude of the misalignment error. Additionally, from a prepress standpoint, the technique inherently requires a relatively large number of cycles to provide the necessary effect. The technique is not intuitive but rather requires a trained eye to determine with any level of certainty that an unacceptable misalignment exists based upon the position of the bright spot within the register mark. The shape and density of the image presented to the eye cannot be designed independent of the pattern interference effects. There is no clear visible indication of registration error.

Another technique which has been proposed for use in ion beam lithography utilizes alignment marks and apertures. The light radiating from the alignment marks is sensed and the intensity of the detected radiating light is measured to determine if the apertures and alignment marks are misaligned. This technique, although providing a relatively accurate means of detecting a misalignment and of obtaining a positional null, is impractical when it comes to image generation/replication operations requiring visual verification of acceptable alignment or quantification of the extent of the misalignment without the use of complex and expensive sensing devices.

SUMMARY OF THE INVENTION

Generally, in one aspect, the invention features a system and method for detecting imaging parameters that includes forming a first image generated with pseudorandom noise and a second image generated with the same pseudorandom noise. The images serve as an imaging parameter sensor when the first and second images are superimposed. The system and method is useful for visually detecting such imaging parameters such as geometric errors. The system and method allows the state of imaging parameters to be detected by the eye unaided by tools such as a microscope and densitometer. The system and method is also usefully combined with such tools to provide even more powerful and sensitive sensors. The system and method is also usefully combined with machine vision systems, which can read the imaging parameter sensors to calibrate or verify the operation of imaging equipment. The sensors are generated with pseudorandom noise, which extends the range of the sensors, and enables new sensor designs.

In general, in one aspect, the invention features a method for visibly detecting an imaging parameter. The method includes forming a first image generated using pseudorandom noise. The method also includes forming a second image generated with the same pseudorandom noise. The second image is configured to visibly display a third image representing the state of an imaging parameter when the first image and second image are superimposed.

In one embodiment, the method includes forming the first image in memory. In another embodiment, the method includes forming the first image on a media. In another embodiment, the method includes forming the second image in memory. In another embodiment, the method includes forming the second image on a media.

In one embodiment, the method also includes the step of Superimposing the first image and the second image, thereby displaying the third image. In one such embodiment, the step of superimposing includes imaging one of the first and second images on a transparent first media, imaging the other of the first and second images on a second media, and overlaying the first media on the second media.

In another embodiment, the method includes forming the first image on a media, and forming the second image on the same media overlaid on the first image, thereby superimposing the first image and the second image on the media.

In another embodiment, the method includes forming the first image in a memory, forming the second image on a media, detecting the second image formed on the media, and combining the first image and detected second image in memory, thereby superimposing the first image and second image. In another embodiment, the method includes forming the first image on a media, forming the second image in a memory, detecting the first image formed on the media, and combining the first image and detected second image in memory, thereby superimposing the first image and second image.

In one embodiment, the state of the imaging parameter comprises an amount of geometric error. In another embodiment, the state of the imaging parameter comprises an amount of a geometric error chosen from the set of registration error, magnification, straightness, orthogonality, length measurement, media stretch, media shrinkage, focus measurement, spot size distortion, spot shape distortion, banding, and linearity.

In one embodiment, the first image includes a first repetitive pattern modulated with pseudorandom noise, and the second image includes a second repetitive pattern modulated with the same pseudorandom noise. In one embodiment the pseudorandom noise is a uniform pseudorandom noise distribution. In another embodiment, the pseudorandom noise is a gaussian pseudorandom noise distribution.

In another embodiment, the first image includes a pseudorandom noise image. The second image is derived from the first image. In one such embodiment, for each of at least one cells in the second image, the method includes forming a reverse image of the corresponding cell in the first image, and phase shifting one or both of a portion of the cell in the second image and a portion of the corresponding cell in the first image. The portion of the cells can include some subset of or all of a cell. Also, it is intended that a phase shift of zero be included, which could result in no phase shift for that cell or cell portion.

In one embodiment, a portion is phase shifted by an amount of imaging parameter state designated for display. In one such embodiment, a portion is phase shifted by the amount of registration error designated for display. In another embodiment, the portion is phase shifted a different amount in the X axis and the Y axis. In another embodiment, the mean pitch of the image is different along different axis. In another embodiment, the coarseness of the image is different along different axis.

In general, in another aspect, the invention relates to a system for displaying an imaging parameter. The system includes a print device configured to form images on media. The system also includes a controller operable to drive the print device to form a first image generated with pseudorandom noise and to form a second image generated with pseudorandom noise that is configured to visibly display a third image representing the state of an imaging parameter when the first image and second image are superimposed.

In one embodiment, the controller is operable to form the first image on a media and to form the second image overlayed on the first image on the same media. In another embodiment, the controller is operable to form the first image on a first media and the second image in a corresponding location on a second media.

In another embodiment, the system includes a memory device configured to store images and an image detector to detect images formed on media. The controller is operable to form one of the first and second images in the memory device, and to drive the print device to form the other of the first and second images on a media. The controller is operable to drive the image detector to detect the other of the first and second images on the media, and to combine in memory the one of the images and the detected other of the images.

In one embodiment, the state of the imaging parameter includes an amount of geometric error. In another embodiment, the state of the imaging parameter includes an amount of geometric error chosen from the list of registration error, magnification, straightness, orthogonality, length measurement, media stretch, media shrinkage, focus measurement, spot size distortion, spot shape distortion, banding, and linearity.

In one embodiment, the controller is operable to drive the print device to form a first image comprising a first repetitive pattern modulated with pseudorandom noise and to form a second image comprising a second repetitive pattern modulated with pseudorandom noise. In another embodiment, the controller is operable to drive the print device to form a first pseudorandom image, and to form a second image derived from the first pseudorandom image.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 5A depicts part lines of pixels in two corresponding tiles such as in FIG. 3A and FIG. 3B.

FIG. 5C depicts an example showing the result of randomizing the parts of the lines of pixels shown in FIG. 5A.

FIG. 8 depicts an embodiment of an image divided into portions.

DESCRIPTION

As described in U.S. patent application Ser. No. 08/789,812, now U.S. Pat. No. 5,857,784, a combination of patterns can be used to create a visual sensor that makes the state of an imaging parameter (such as registration error, magnification error, and other such parameters) easily recognizable by the human eye or a machine vision system. The patterns are generated such that the state of the imaging parameter makes a symbol or other effect appear in the combined image. The two images are combined by superpositioning, superimposing, or overlaying the images in various ways to produce a resulting third image that displays the state of the imaging parameter. Generally, the term imaging parameter denotes a parameter that affects the appearance of an image, and includes various geometric errors including registration error.

Figure 1A:
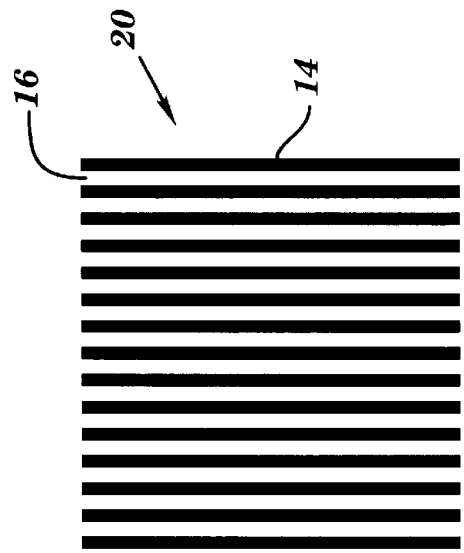
FIG. 1A depicts a first image for forming an image parameter sensor.

FIG. 1A depicts a first pattern 10 which is used to form such a sensor. As depicted, the pattern 10 has the symbol "F" embedded therein and identified with reference numeral 2. The pattern 10 is formed of multiple parallel lines 4 having a pitch, a spatial frequency, and a duty cycle. The pitch is the number of repeating pixels. For example, a 1-on, 4-off pattern has a pitch of 5 pixels. The spatial frequency is 1/pitch. The duty cycle is the number of "on" pixels divided by the pitch, so the duty cycle of a 1-on, 4-off repeating pattern is (⅕) 20%.

FIG. 1A depicts a 13× magnification of the actual pattern generated at 3600 dpi addressability. The multiple parallel vertical lines 4 are four pixels in width and have a twelve pixel pitch which is equivalent to 3.3 mils at 3600 dpi. The unwritten areas 6 between the lines 4 of the pattern 10 have a width of eight pixels.

Figure 1B:
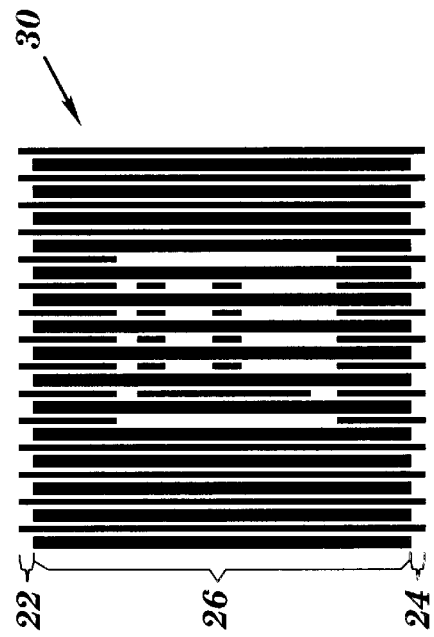
FIG. 1B depicts a second image for forming the image parameter sensor.

FIG. 1B depicts a second pattern 20 which will also be used to form the sensor. The pattern 20 has an identical spatial frequency but a different duty cycle than pattern 10 of FIG. 1A. Pattern 20 is formed of multiple parallel lines 14. As depicted, the multiple lines 14 of the pattern 20 have a six pixel width and twelve pixel pitch. The unwritten spaces 16 each also have a width of six pixels.

The spatial frequency and duty cycle of the patterns 10 and 20 are exemplary. In the disclosed embodiment, the spatial frequency of patterns 10 and 20 are equal to each other. The width of the lines 4 of pattern 10 could be reduced to a single pixel width or increased as may be desirable for the particular implementation. The spaces 6 between the lines will typically be increased or decreased depending on the width of the lines 4. Similarly, the thickness of the lines 14 of the pattern 20 will generally be increased or decreased depending both upon the thickness of the lines 4 of pattern 10 and the misalignment error tolerance, if any. The unwritten spaces 16 of pattern 20 will likewise be increased or decreased with the increase or decrease in the width of the lines 14.

If zero error tolerance is required, the width of lines 14 of pattern 20 is beneficially made equal to the width of lines 4 of pattern 10; however, if some degree of misalignment can be tolerated, the width of the lines 14 will preferably exceed the width of the lines 4. In the present case, the position error tolerance, is one pixel in either horizontal direction. Accordingly, the width of the lines 14 of pattern 20 exceeds that of lines 4 of pattern 10 by two pixels.

Figure 1C:
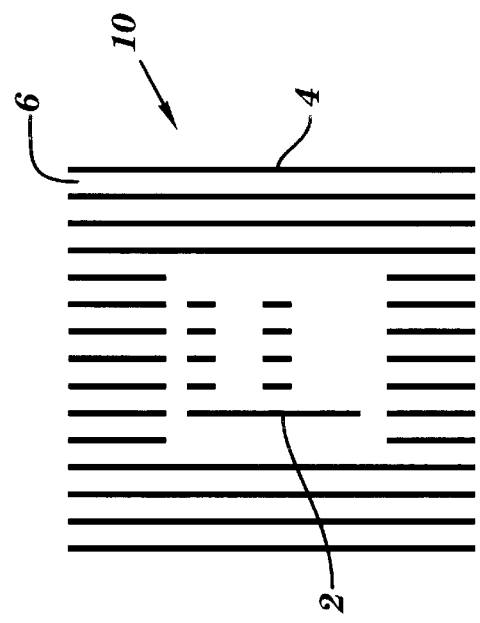
FIG. 1C depicts a sensor indicative of 0° phase error.

FIG. 1C depicts the pattern 20 superimposed, or superpositioned over the pattern 10 to form a registration mark or pattern 30 with zero phase error, i.e., the patterns 10 and 20 are perfectly aligned. As can be seen in FIG. 1C, the pattern 10 has portions 22 and 24 consisting of the segments of lines 4 which extend beyond respective ends or edges of the lines 14 of pattern 20. The other portion 26 of pattern 10 has the symbol 2 embedded therein. The extended portions 22 and 24 of the registration pattern 30 can be used to quantify the misalignment to an accuracy of a fraction of a pixel, even if the misalignment of the patterns 10 and 20 is within an acceptable position error tolerance.

With the patterns 10 and 20 in alignment, as shown in FIG. 1C, the embedded symbol 2 is hidden by the lines 14 of pattern 20. So long as any misalignment between patterns 10 and 20 is less than one pixel in either direction, and hence within the acceptable position error tolerance, the embedded symbol 2 of pattern 10 will remain masked by the lines 14 of pattern 20 and thus will not be visible. Accordingly, an observer viewing the registration mark 30 can quickly and easily determine with the unaided eye, i.e., without the use of a magnifying lens, that the alignment of the patterns 10 and 20 is within tolerance and the repeatability of images is acceptable.

Figure 1D:
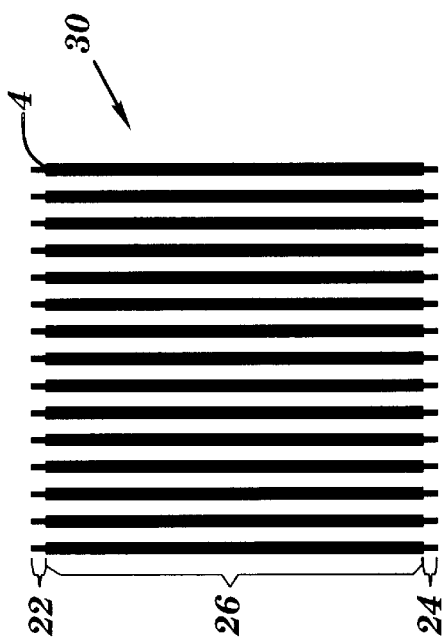
FIG. 1D depicts a sensor indicative of 180° phase error.

FIG. 1D depicts the registration mark 30 with the patterns 10 and 20 180° out of phase. As indicated in FIG. 1D, the embedded symbol 2 of pattern 10, i.e., the character "F", is fully unmasked by the misalignment. The character "F" is exposed with a high density border around it. This provides a dramatic visual indication to the unaided eye that the position error threshold or tolerance has been exceeded. The density of the embedded symbol 2 and the border around it will, in this example, vary linearly with the magnitude of the misalignment error at a rate of approximately 30% dot per mil error. However, if desired, the patterns could be selected to provide a non-linear density variation.

The embedded symbol 2 remains masked by the pattern 20 until the misalignment between symbols 10 and 20 exceeds the one pixel the position error tolerance, i.e., 0.27 mil in the present example, in either horizontal direction. In the present example, the duty cycle were chosen specifically to maximize the visual contrast between a 0° and 180° phase error in the alignment of symbols 10 and 20. However, the duty cycle of the respective patterns could be chosen to maximize the visual contrast at different phase error states, if so desired. In any event, it is of primary importance that the symbol 2 become visible upon the misalignment exceeding the acceptable position error tolerance, i.e., upon the positional error minimally exceeding the position error tolerance.

The unmasking of both the embedded symbol 2 and those lines 4 in portion 26 of the pattern 10 which do not form part of symbol 2, change the density of the registration mark 30 when the misalignment between the patterns 10 and 20 exceeds the misalignment threshold or tolerance. If desired, pattern 10 could be formed only by the symbol 2 or without an embedded symbol. In either case, a visible density change will occur with the patterns 180° out of phase. However, the use of the embedded symbol enhances the visual effect and the intuitive nature of the registration mark 30 such that an observer can confidently determine with the unaided eye if patterns 10 and 20 are misaligned beyond the acceptable tolerance without evaluation of density. It will, of course, be recognized by those skilled in the art that although, in this example, a maximum density change occurs at 180° phase error, a visible density change will occur over approximately a ±300° phase range. That is, the symbol will remain exposed to some extent over this range.

FIGS. 2A–F are directed to the formation of a single registration mark having a single embedded symbol which allows visual detection with the unaided eye of unacceptable misalignments in either of two orthogonal directions.

Figure 2A:
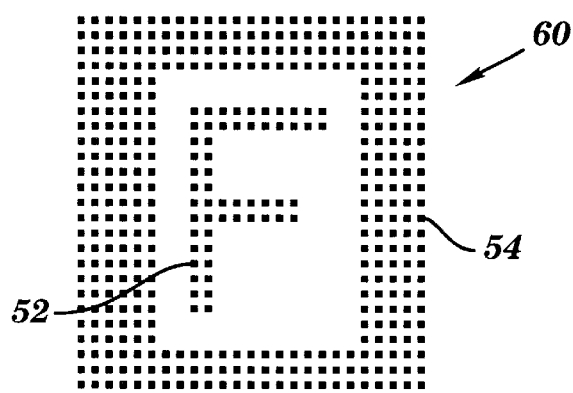
FIG. 2A depicts a first image with an embedded symbol for use in forming a sensor to visually detect position errors in two orthogonal directions.

FIG. 2A depicts a first symbol 60 which includes spaced elements 54 formed in an array having embedded therein a symbol 52. The spaced elements 54 are of equal width and equal length and are also equally spaced. The width, length and spacing of the elements 54 can be established as desirable for the applicable implementation as will be understood by the skilled artisan. FIG. 14B depicts a second pattern 70 which includes spaced elements 64 formed in an array. The spaced elements 64 are also equally spaced and of equal length and equal width. The spacing, i.e., pitch of the elements 64 is identical to that of the elements 64 of FIG. 14A. However, the width and length of each element 64 is greater than that of each element 54. Accordingly, the pattern depicted in FIG. 2B exceeds the density of the pattern depicted in FIG. 2A, even outside the border of the symbol 52. This difference in the respective sizes of the elements 54 and 64 reflects the applicable acceptable misalignment error tolerance in the horizontal and vertical directions. If, however, no misalignment error could be tolerated, the elements 54 and 64 would be identical in size and spacing.

Figure 2B:
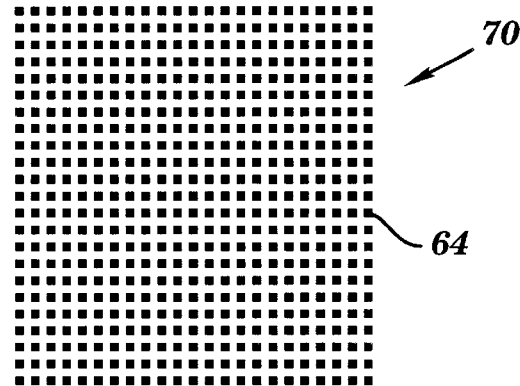
FIG. 2B depicts a second image for use with the image of 2A to form a sensor to visually detect position errors in two orthogonal directions.
Figure 2C:
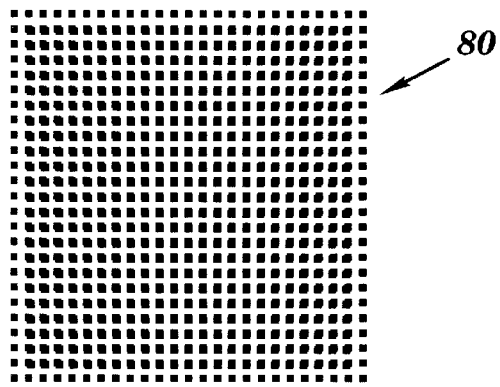
FIG. 2C depicts the sensor formed with FIGS. 2A and 2B in alignment.
Figure 2D:
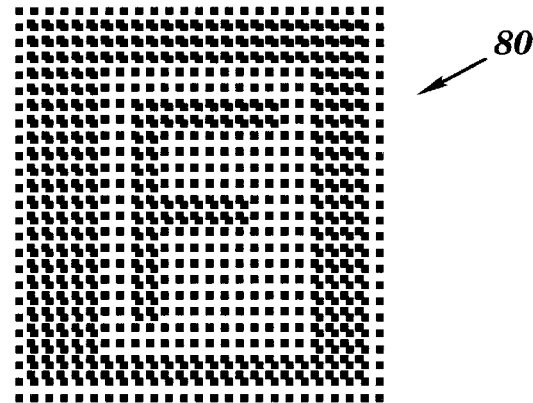
FIG. 2D depicts the sensor formed with FIGS. 2A and 2B with a horizontal and vertical position error.
Figure 2E:
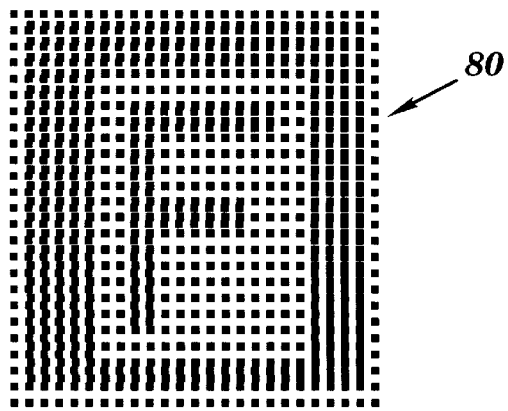
FIG. 2E depicts the sensor formed with FIGS. 2A and 2B with a horizontal position error.
Figure 2F:
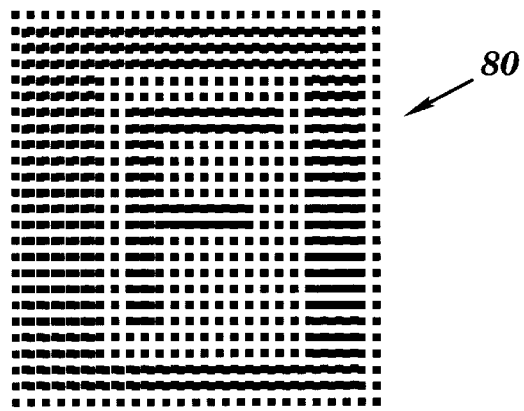
FIG. 2F depicts the sensor formed with FIGS. 2A and 2B with a vertical position error.

FIG. 2C depicts a registration mark 80 formed by superpositioning the patterns 60 and 70. As shown, the patterns are in perfect alignment. Accordingly, the embedded symbol remains masked. FIG. 2D depicts the registration mark 80 with a 180° vertical and horizontal phase error. Accordingly, the symbol 52 is now exposed and visually perceivable with the unaided eye. FIG. 2E depicts the registration pattern or mark 80 with a 180° phase error in the horizontal direction. As indicated, the symbol 52 is also unmasked by the horizontal alignment error so as to be visually perceivable with the unaided eye. FIG. 2F depicts the registration mark 80 with a 180° phase error in the vertical direction. As shown, the symbol "F" is unmasked by the vertical alignment error so as to be visually perceivable with the unaided eye. Because the unmasked "F" varies to some extent dependent upon the direction or directions of the unacceptable misalignment error, the observer is also able to immediately detect the direction(s) of the misalignment error. In other embodiments, separate symbols such as horizontal and vertical arrows that are sensitive to horizontal and vertical errors, respectively, are used to provide an improved visual indication of the error direction. It also should be noted that the visibility of the exposed symbol will increase or decrease based upon the relative size of the symbol with respect to the pitch of the pattern. Accordingly to improve visibility, the size of the symbol is increased relative to the pitch of the pattern.

As will be discussed further below, the patterns themselves may be formed on different sheets of media and the respective sheets physically overlaid and aligned such that the patterns 10 and 20 are superpositioned to allow detection of an unacceptable misalignment error or to determine the degree of misalignment. Alternatively, the patterns may be formed, one on top of the other so as to be superpositioned on a single sheet of media. One pattern may be preprinted on a sheet of media and the other pattern formed so as to be superpositioned on the preprinted pattern to form the registration mark. If desired, the registration mark or the respective patterns may be formed at various locations on a single sheet of media.

It may be desirable to form one or both patterns multiple times in a superpositioned fashion to, for example, confirm the repeatability of the scan engine or offset printer over many sheets of media. More than two patterns could be utilized so that if multiple superpositioned patterns are used to form the registration mark, the particular pattern(s) which are misaligned can be specifically identified. Each of the multiple patterns may be of a different color to further enhance detection of any misalignment.

The patterns 10, 60 depicted in FIGS. 1A and 2A could, if desired, be formed in the four corners of several identical sheets of media. By offsetting the patterns 10 on each successive sheet by the width of the pattern 10, an array of patterns 10 is formed in the corners of each sheet. On a final sheet of the media, the pattern 20 can be formed multiple times at each of the four corners of the sheet in positions corresponding to those of the patterns 10 written on the other sheets of media. By overlaying the final sheet of media over each of the other sheets of media one at a time, a misalignment between any of the patterns 10 on the respective sheets of media and the pattern 20 on the final sheet of media which exceeds the position error tolerance can be easily detected with the unaided eye. In one embodiment, one or more reference marks are simultaneously formed or preprinted on the final sheet to duplicate the appearance of registration mark 30 at predetermined phase errors for calibration purposes.

In yet another embodiment, the patterns could be imaged in each corner of several identical sheets, and all of the sheets can be overlaid on top of one sheet containing the mask 20 to determine if there is registration error in all of sheets at once. If any one of the overlaid sheets was imaged with registration error, the symbol will appear.

Design goals in developing image parameter sensors are (1) to create sensors that are as small as possible, (2) to create sensors that can provide sufficient magnification of the imaging parameter changes (i.e. are sensitive to small changes), (3) to create sensors that provide a sufficient tint change so they are readily detectable by a human eye or machine vision system, (4) to create sensors that provide a sufficiently large symbol (or other visual device or effect) so as to be easily perceived by the unaided eye (i.e. without optical magnification), and (5) to create sensors that minimize or eliminate any need for subjective judgement in interpreting sensor results. Smaller sensors are more useful because they are generally more efficient in that they take up less room on an imaging media, less memory and computing resources, and so on. Generally, the pitch of a pattern is typically five to twenty times the minimum detectable registration error of the sensor, also referred to as the spatial resolution of the sensor. As for detectable tint change, generally, a 2% tint change is the threshold of detection, and a tint change of less than 5% is not reliably detected. A balance is usually made between these design goals.

Separate sensors of different spatial frequencies can be concatenated to extend the range of the combined set of sensors. However, this still limits the range to about 100 times the resolution and constrains the visibility, size, sample density, and design of the symbols.

It is also desirable to create sensors that have a useful operating range, meaning that they display a visible indicator for a particular value or set of values, and are not visible for others. One limitation of the embodiments of FIGS. 1A–1D and FIGS. 2A–2F is that their operating range is limited to the fundamental pitch of the symbol pattern. (Here, the fundamental pitch is the pitch of the smallest repeating element in the pattern). In other words, if the repetitive pattern repeats at a pitch of 10 pixels (i.e. the fundamental pitch is 10 pixels), the symbol will show the same symbol display repeating at 10 pixel error increments, that is at 10 pixel registration error, 20 pixel error, 30 pixel error, and so on.

Figure 3A:
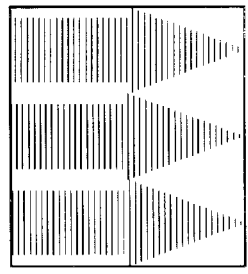
FIG. 3A depicts an embodiment of a first image with three embedded symbols for use in forming a sensor to visually detect position errors in the horizontal direction.
Figure 3B:
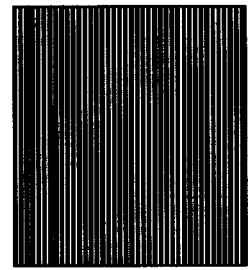
FIG. 3B depicts an embodiment of a second image for use with the image of 3A to form a sensor to visually detect position errors in the horizontal direction.

Referring to FIGS. 3A–3I, the operating range limit just described is shown by example with the pair of images of FIG. 3A and FIG. 3B that are used to detect registration error in the X axis. Here, these small images are also referred to as tiles. The image of FIG. 3A, referred to as the symbol tile, includes three arrow symbols 102A, 102B, 102C, generally 102. The image of FIG. 3B is referred to as the mask tile. The symbol patterns 102 and mask pattern of FIG. 3B are produced by amplitude modulation, meaning that they are created by generating a on-off line pattern in the desired shape. The mask tile of FIG. 3B is a four-on, one-off repetitive pattern, producing an 80% tint. The arrow symbols 102 are drawn with lines having the same pitch (five pixels) as the mask tile of FIG. 3B, but with a different pattern. The arrow symbols 102 are one-on, four-off repetitive lines phased to fill in the one-pixel slot in the mask tile of FIG. 3B at different registration error thresholds. The three arrows 102 each have the same fundamental pitch of five pixels, but are phase shifted by a different number of pixels. Each arrow symbol 102 is offset, or phase shifted in the X direction, from the other arrow symbols 102.

Figure 3C:
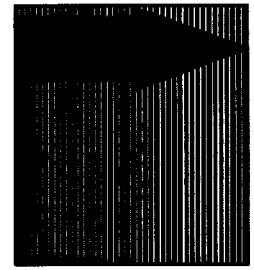
FIG. 3C depicts the sensor formed with FIGS. 3A and 3B in alignment.
Figure 3D:
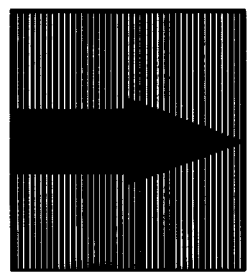
FIG. 3D depicts the sensor formed with FIGS. 3A and 3B with one pixel alignment error.
Figure 3E:
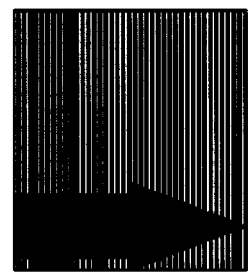
FIG. 3E depicts the sensor formed with FIGS. 3A and 3B with two pixels alignment error.
Figure 3F:
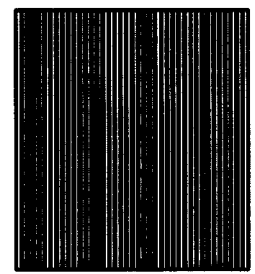
FIG. 3F depicts the sensor formed with FIGS. 3A and 3B with three pixel alignment error.
Figure 3G:
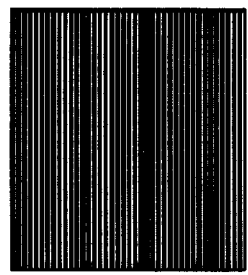
FIG. 3G depicts the sensor formed with FIGS. 3A and 3B with four pixels alignment error.

When the symbol tile of FIG. 3A and mask tile of FIG. 3B are overlaid, the first symbol 102A is visible when there is zero registration error. This is shown in FIG. 3C. The arrow symbol is visible as a 100% tint at the selected registration error threshold, because the arrow symbol 102A fills in the gaps in the mask tile of FIG. 3B. The second arrow 102B is visible when there is one pixel registration error, shown in FIG. 3D. The third arrow 102C is visible when there is two pixels registration error, shown in FIG. 3E. A different arrow 102 is visible at different position errors because the lines that make up each of the arrows are phase shifted, and so each arrow fills in the gaps in the mask tile of FIG. 3B at a different registration error. No symbols are visible when there is three pixels error (FIG. 3F) or four pixels error (FIG. 3G), because the arrow symbols 102 are hidden by the mask tile pattern 111.

Figure 3H:
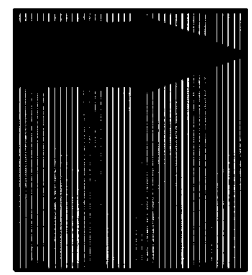
FIG. 3H depicts the sensor formed with FIGS. 3A and 3B with five pixels alignment error.
Figure 3I:
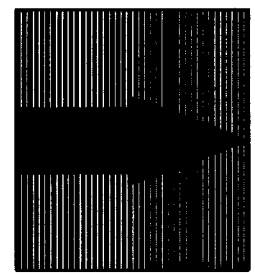
FIG. 3I depicts the sensor formed with FIGS. 3A and 3B with six pixels alignment error.

As shown in the figure, the arrow symbols 102 of FIG. 3A are visible not only for the selected registration errors, but also for registration errors greater than the fundamental pitch of the symbols, which in this example is five pixels. The first arrow 102A, which was visible at zero pixels registration error is also visible at five pixels registration error, as shown in FIG. 3H. The second arrow 102B, which was visible at one pixel registration error is also visible at six pixels registration error, as shown in FIG. 3I. The second arrow would also be visible at eleven pixels registration error, sixteen pixels registration error, and so on. The operating range of this registration error sensor is thus 5 pixels of registration error. A six pixels error is displayed in an identical manner to a human or machine observer as the one pixel error.

It is possible to increase the operating range of a symbol/mask pair by modulating the fundamental pitch of the symbol and mask tiles with pseudorandom noise. The tile resulting from such modulation has the same average pitch as the unmodulated tile, and the (pseudorandom noise modulated) mask unmasks the symbol(s) included in the symbol tile at the same designated registration error(s) as the unmodulated symbol tile. But the modulation with pseudorandom noise changes the tile such that no given segment of the tile is the same. The result is that, after modulation with pseudorandom noise, when the symbol and mask tile are combined, they produce a unique non-repetitive pattern. There is no repetition of a given symbol at registration error increments equal to the pitch, as there was in the images of FIG. 3A and FIG. 3B. The operating range of the sensor is therefore extended from the fundamental pitch of the tile to the full length of the tile.

Figure 4A:
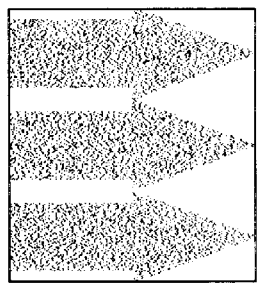
FIG. 4A depicts an embodiment of the image of FIG. 3A modulated with pseudorandom noise for use in forming a sensor to visually detect imaging parameter errors in the horizontal direction.
Figure 4B:
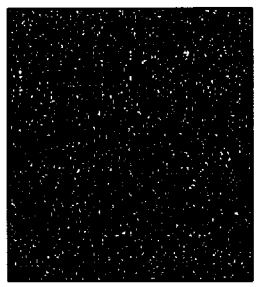
FIG. 4B depicts an embodiment of the image of FIG. 3B modulated with pseudorandom noise for use with the image of 4A to form a sensor to visually detect position errors in the horizontal direction.
Figure 4C:
FIG. 4C depicts the sensor formed with FIGS. 4A and 4B in alignment.
Figure 4D:
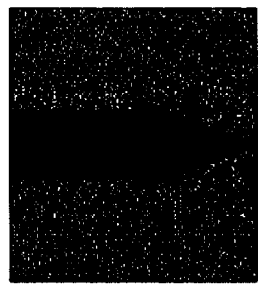
FIG. 4D depicts the sensor formed with FIGS. 4A and 4B with one pixel alignment error.
Figure 4E:
FIG. 4E depicts the sensor formed with FIGS. 4A and 4B with two pixels alignment error.
Figure 4F:
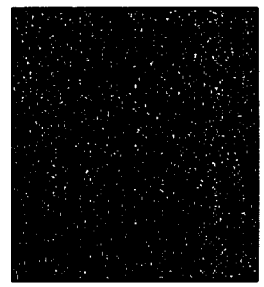
FIG. 4F depicts the sensor formed with FIGS. 4A and 4B with three pixel alignment error.

Referring to FIGS. 4A–4I, the symbol tile of FIG. 4A is the symbol tile of FIG. 3A modulated with a uniform pseudorandom noise distribution centered at zero having a maximum variance of ±three pixels. In the embodiment of FIG. 4A, the pseudorandom noise distribution has a variance of six pixels peak-to-peak. This is one pixel more than the five-pixel fundamental pitch of the patterns. This variance is not a requirement, but has been shown to have good results. The mask tile of FIG. 4B is the mask tile of FIG. 3B that is modulated with the same pseudorandom noise distribution.

Figure 4G:
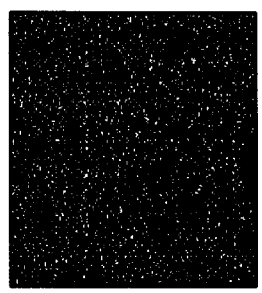
FIG. 4G depicts the sensor formed with FIGS. 4A and 4B with four pixels alignment error.
Figure 4H:
FIG. 4H depicts the sensor formed with FIGS. 4A and 4B with five pixels alignment error.
Figure 4I:
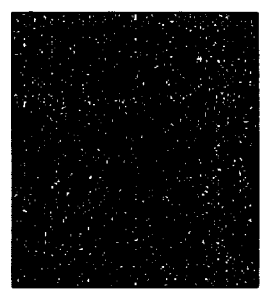
FIG. 4I depicts the sensor formed with FIGS. 4A and 4B with six pixels alignment error.

The benefits of modulating with pseudorandom noise are shown in the tiles of FIGS. 4C–4I, which show the result of overlaying the symbol tile 130 with the mask tile 131. At zero pixels registration error, the first arrow is visible in FIG. 4C. At one pixel registration error, the second arrow is visible in FIG. 4D. At two pixels registration error, the third arrow is visible in FIG. 4E. Like the unmodulated tile pair overlay of FIG. 3F and FIG. 3G, no symbol is visible at three pixels error (FIG. 4F) and four pixels error (FIG. 4G). Unlike the unmodulated tile pair of FIG. 3H and FIG. 3I, however, no symbol is visible at five pixels error (FIG. 4H) or six pixels error (FIG. 4I) either. Each arrow is unmasked only once, at its designated display registration error thresholds of zero, one, and two pixel errors respectively. In other words, the symbols do not display with every additional five pixels of registration error as they did with the symbols not modulated with pseudorandom noise.

The number of symbols is exemplary and is not intended to limit the invention. In one embodiment, one large symbol tile 130 contains a unique symbol for every possible registration error. Generally, practical limitations on symbol size, tile size, and sampling rate necessary for the symbol to be visible limit the number of symbols that can be included in a single tile.

Referring to FIG. 5A, in one embodiment, repetitive patterns, such as the patterns in FIG. 3A and FIG. 3B, have a pitch (P), and an off pulse width ($W_m$), which can be selected based on a maximum tint level (T) that allows the mask to be printable, and the minimum registration error increment designated to cause the symbol to change from fully visible to fully masked. Pitch is related to these design factors according to the formula $P=(1/(1-T))*W_m$. In the example of FIG. 5A, Tile B is a 4-on, 1-off, pattern that repeats every 5 pixels. For this example, Wm=1 pixel, T=0.8 (80% tint) and P=5 pixels. In this example, the Tile A modulation pattern is the reverse of Tile B. Tile A is a 4-off, 1-on repeating pattern. The ON pulse width for the Tile A modulation pattern, $W_S$, is selected based on the designated registration error range over which a given symbol is to remain visible ($W_s=1$ in the example), which also sets the duty cycle for the pattern. The duty cycle can be adjusted to allow for display of various registration error values.

Figure 5B:
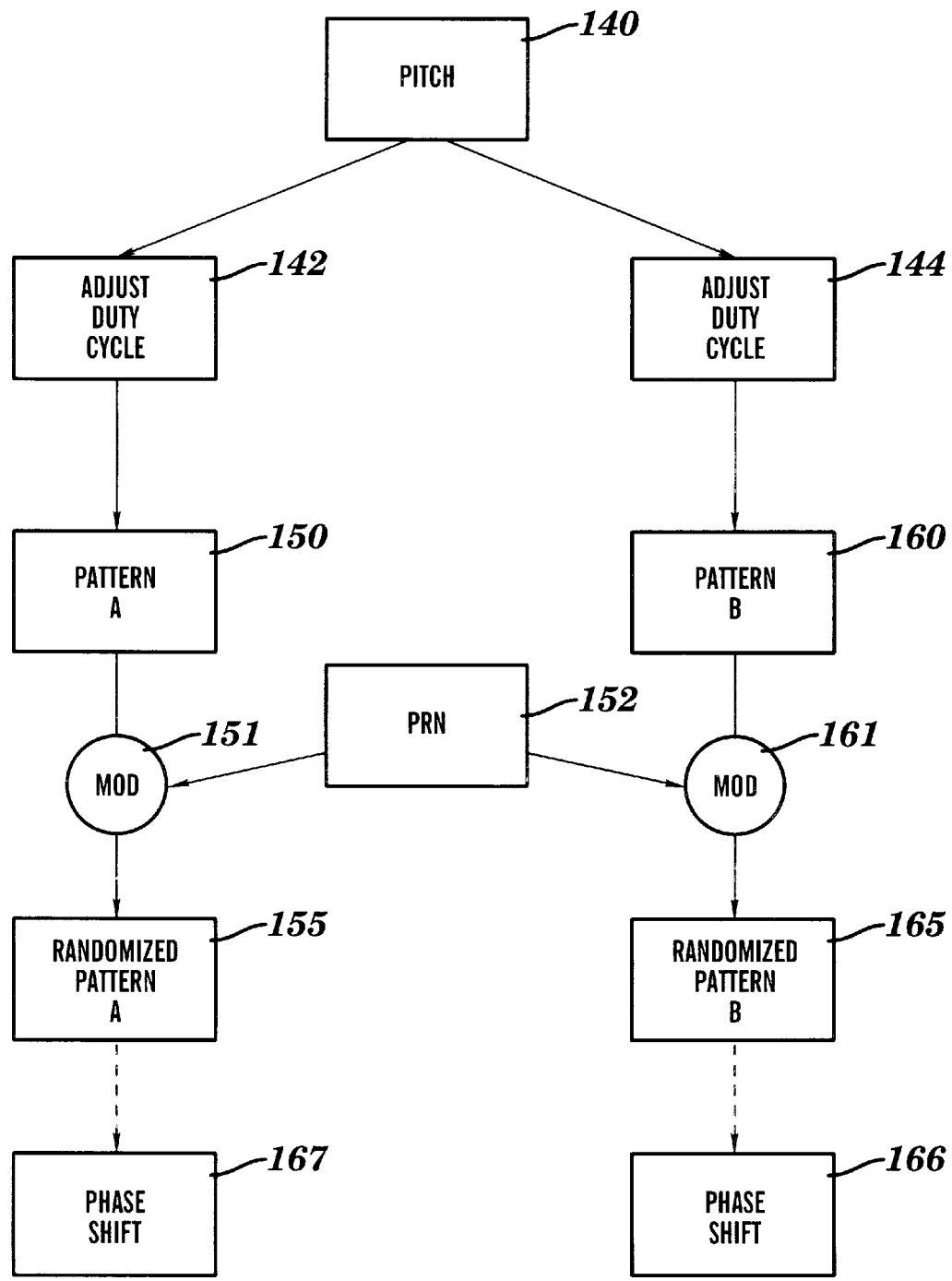
FIG. 5B is a block diagram of an embodiment of a method for generating randomized images.

Referring to FIG. 5B, in one embodiment, the fundamental pitch of the patterns is chosen first 140. If desired, the duty cycle of Tile A is adjusted 142, and/or the duty cycle of Tile B is adjusted 144. The adjustment 142, 144 can include no change. The resulting images 150, 160 are modulated 151, 161 with pseudorandom noise 152. The examples shown in FIG. 3 and FIG. 4 are for a 1 dimensional horizontal position sensor. In a similar manner a 2 dimensional sensor position can be constructed, for example, by beginning with the 2 dimensional repetitive patterns shown in FIG. 2A & FIG. 2B.

The pseudorandom noise can be a random or pseudorandom noise pattern generated in one of the many ways known in the art. The pseudorandom noise can have a uniform, gaussian, or other distribution. In one embodiment, the pseudorandom noise is generated using a pseudorandom function running on a personal computer. For example, the program MATLAB by THE MATHWORKS, INC. of Natick, Massachusetts includes such a pseudorandom function. Various variance values can be used to generate the pseudorandom noise. In one embodiment, the variance is less than the fundamental pitch. After the randomized patterns are generated 155, 165, one or both of the images are phase shifted 166, 167.

In one embodiment, multiple iterations of the image are also overlaid, to allow for the inclusion of multiple symbols in an image. For example, multiple iterations of Tile A can be generated that include different symbols that are then phase shifted 167 by a different amount. These images can be ORed together to created a combined symbol image. This is one way that the multiple arrow image of FIG. 4A could be generated.

In one embodiment, to create the image modulated with pseudorandom noise, the start address of each ON pulse in Tile A is phase shifted by a small random value. Similarly, the address of each OFF pulse in Tile B is phase shifted by the same random value. In one embodiment, this is accomplished by first identifying the ON pulses in Tile A and the OFF pulses in Tile B, and then shifting the pulses by a (pseudo)random amount. In another embodiment, the repetitive nature of the patterns allows for a modulation that is accomplished by adjusting the start of the pulses based on the random values as the images are generated. In other words, the images are randomized as they are generated.

Referring to FIG. 5C, an example of a part of a line of pixels shows 20 pixels, numbered 1–20. The value of each pixel is shown as 0 or 1. In Tile A, before randomization, a 4-on, 1-off pattern is displayed. This is the part of the line shown for Tile A in FIG. 5A. In the line of pixels, pixel 1 is a 1, pixel 2 is a 1, pixel 3 is a pixel 4 is a 1, pixel 5 is a 0, and so on.

Part of the sequence used to randomize the images (shown as PRNSEQ) is shown on the line below as 2, −1, 1, −2, . .

. The pseudorandom numbers are shown underneath the beginning of each ON pulse in Tile A. In this example, the ON pulses are 1 pixel, but could be wider in other embodiments.

Based on this pseudorandom sequence, the first ON pulse in Tile A, which is at pixel 5, is shifted by 2 to pixel 7. The second ON pulse in Tile A, which is at pixel 10, is shifted by −1 to pixel 9. The third ON pulse in Tile A, which is at pixel 15, is shifted by 1 to pixel 16. The fourth ON pulse in Tile A, which is at pixel 20, is shifted by −2 to pixel 18. As a result of the shift, there are 1's at pixels 7, 9, 16, and 18, and the other pixels in the line are 0's.

Tile B, which in this example is the reverse of Tile A, is also modulated accordingly. Thus, in the corresponding line of Tile B, 0's will appear at pixel 7, pixel 9, pixel 16, and pixel 18. In one embodiment, a pulse shifted off the right edge of a line appears at the beginning of the next line, and a pulse shifted off the left edge of a line will appear at the end of the previous line.

The randomization changes the images so that corresponding portions of the two images will align, but different portions of the images will not.

Referring again to FIG. 5B, one or both of the resulting randomized patterns 155, 156, is phase shifted, to allow for display of the parameters at a particular registration error or range of registration errors. A phase shift of zero is possible, which could result in no phase shift, and display of the symbol if the two images are in alignment. In another embodiment, the phase shifting step takes place as part of the randomization process by adding a constant to the amount of randomized shift. In another embodiment, the phase shifting of the images takes place before the randomization.

The embodiment of the above example can be described mathematically as follows. If Tile A is an (m×n) pixel image of m rows of n pixels, and (P) is the pitch, the number of repetitive cycles ($N_{cyc}$) in the image is ((m*n)/P). If each pixel il the image has an address number obtained by numbering across each row consecutively, the address of each pulse ($I_A$) is shifted by a random value ($PRN_{seq}$) to the address ($J_A$). The new address of each pulse $J_A$=is given by: ($J_A=I_A+PRN_{seq}$), where $I_A$ is a series of values beginning with ((P−$W_m$)+1) and incremented by the pitch (P) until the final value (($N_{cyc}$−$W_m$)+1) is reached. Similarly, for Tile B, ($J_B=I_B+PRN_{seq}$), where $I_B$ is the series of values starting with ((P−Ws)+1) and incremented by P until ((Ncyc−Ws)+1) is reached.

It should be noted that this same technique can be extended along the other axis, so that randomization of the one dimensional sensor just described is extended to provide 2 dimensional randomization, for example to randomize the patterns for the 2 dimensional sensor shown in FIG. 2A and FIG. 2B.

Figure 6A:
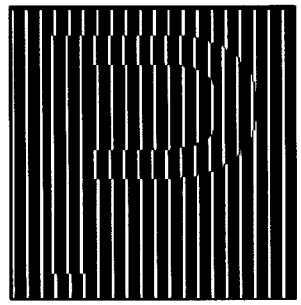
FIG. 6A depicts a first image with an embedded symbol generated by phase modulating a mask image for use in forming a sensor to visually detect position errors in the horizontal direction.
Figure 6B:
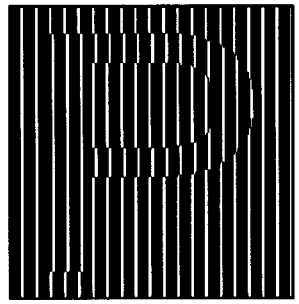
FIG. 6B depicts a second image with an embedded symbol generated by phase modulated a mask image for use with the image of 6A to form a sensor to visually detect position errors in the horizontal direction.

Referring to FIG. 6A–6I, the technique of modulating with pseudorandom noise also extends the range of sensors generated by phase modulating (phase shifting) an amplitude modulated mask. As shown in FIG. 6A and FIG. 6B, a sensor is generated by phase shifting portions of a four-on, one-off mask tile, such as the mask tile of FIG. 3B, so that the overlaid tiles 210, 211 produce a P-shaped symbol at one pixel registration error. The symbol portions of the tile of FIG. 6A and FIG. 6B are (phase) shifted in opposite directions.

Figure 6C:
FIG. 6C depicts the sensor formed with FIGS. 6A and 6B in alignment.
Figure 6D:
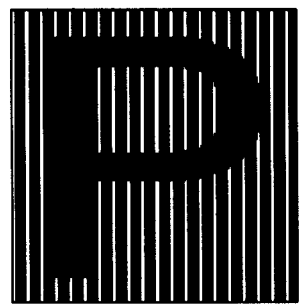
FIG. 6D depicts the sensor formed with FIGS. 6A and 6B with one pixel alignment error.
Figure 6E:
FIG. 6E depicts the sensor formed with FIGS. 6A and 6B with two pixel alignment error.
Figure 6F:
FIG. 6F depicts the sensor formed with FIGS. 6A and 6B with three pixels alignment error.
Figure 6G:
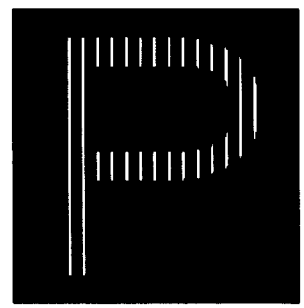
FIG. 6G depicts the sensor formed with FIGS. 6A and 6B with four pixels alignment error.
Figure 6H:
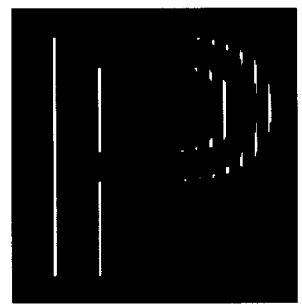
FIG. 6H depicts the sensor formed with FIGS. 6A and 6B with five pixels alignment error.
Figure 6I:
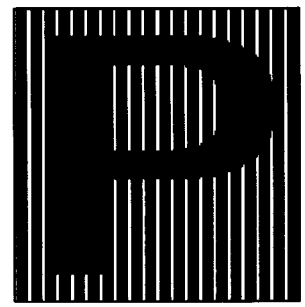
FIG. 6I depicts the sensor formed with FIGS. 6A and 6B with six pixels alignment error.

As shown in FIGS. 6C–6I, which show the tiles of FIG. 6A and FIG. 6B overlaid at various registration errors, the P symbol is not visible when the image of FIG. 6A and the image of FIG. 6B are in alignment (FIG. 6C). The P symbol is clearly visible at one pixel registration error (FIG. 6D), and is not visible at two pixels registration error (FIG. 6E) or three pixels registration error (FIG. 6F). The symbol is somewhat visible at four pixels registration error (FIG. 6G) and five pixels registration error (FIG. 6H). The symbol is as visible at six pixels registration error (FIG. 6I) as it was at one pixel registration error (FIG. 6D).

The operating range of sensors generated by phase shifting portions of the mask is, like the sensors generated with amplitude modulation (such as the sensors of FIGS. 3A–3I), limited by the range of the fundamental pitch of the images. In this case, the fundamental pitch is the pitch of the image from which the tiles are generated (i.e. FIG. 3B). As in the example of FIGS. 3A–3I, a symbol visible at one pixel registration error (FIG. 6C) is also visible at six pixels registration error (FIG. 6H), eleven pixels registration error (not shown), and so on. Increasing the fundamental pitch of the mask pattern extends the range of the sensor, but possibly to the detriment of other sensor design goals.

Figure 7A:
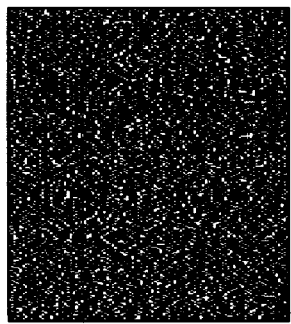
FIG. 7A depicts an embodiment of the image of FIG. 6A modulated with pseudorandom noise for use in forming a sensor to visually detect position errors in the horizontal direction.
Figure 7B:
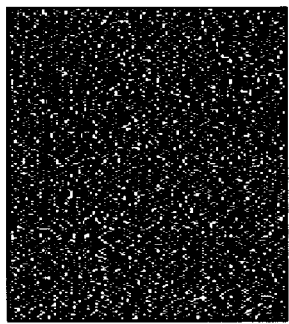
FIG. 7B depicts an embodiment of the image of FIG. 6B modulated with pseudorandom noise for use with the image of 7A to form a sensor to visually detect position errors in the horizontal direction.
Figure 7C:
FIG. 7C depicts the sensor formed with FIGS. 7A and 7B in alignment.
Figure 7D:
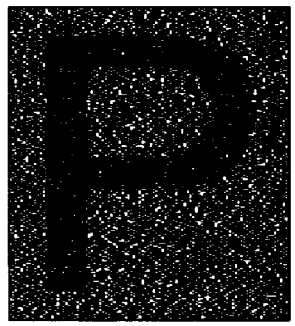
FIG. 7D depicts the sensor formed with FIGS. 7A and 7B with one pixel alignment error.
Figure 7E:
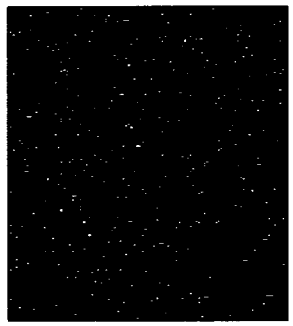
FIG. 7E depicts the sensor formed with FIGS. 7A and 7B with two pixels alignment error.
Figure 7F:
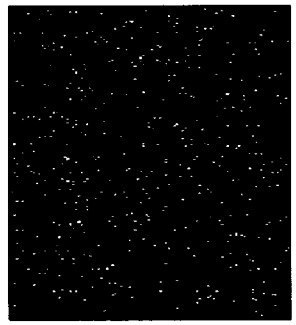
FIG. 7F depicts the sensor formed with FIGS. 7A and 7B with three pixels alignment error.
Figure 7G:
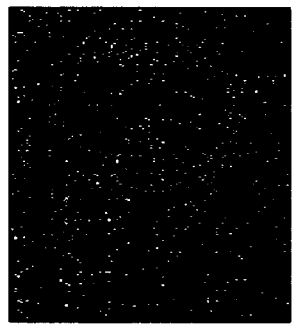
FIG. 7G depicts the sensor formed with FIGS. 7A and 7B with four pixels alignment error.
Figure 7H:
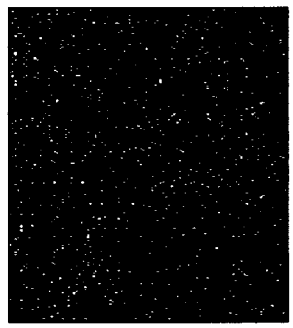
FIG. 7H depicts the sensor formed with FIGS. 7A and 7B with five pixels alignment error.
Figure 7I:
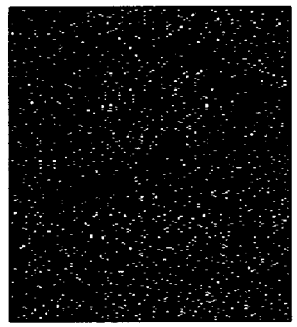
FIG. 7I depicts the sensor formed with FIGS. 7A and 7B with six pixels alignment error.

Referring to FIGS. 7A–7I, modulating these sensor tiles (FIG. 6A and FIG. 6B) with pseudorandom noise extends the operating range of the sensor. FIG. 7A shows the tile of FIG. 6A modulated with pseudorandom noise, such as described with regard to FIG. 5. FIG. 7B shows the tile of FIG. 6B modulated with the same pseudorandom noise. As shown in FIGS. 7C–7I, as a result of modulating the tiles of FIG. 6A and FIG. 6B with pseudorandom noise, the P symbol is visible in the resulting sensor only at the desired one-pixel registration error threshold (FIG. 7D). The symbol is not visible at registration errors of two pixels (FIG. 7E), three pixels (FIG. 7F), four pixels (FIG. 7G), five pixels (FIG. 7H), or six pixels (FIG. 7I), or seven pixels.

Thus, in both the example of FIGS. 4A and 4B and FIGS. 7A and 7B, a first image is formed that has a first repetitive pattern modulated with pseudorandom noise. A second image is formed that has a second repetitive pattern modulated with the same pseudorandom noise. The second image is configured to visibly display a third image representing the state of an imaging parameter when the first image and second image are superimposed. Either image can be formed in the memory of a computer or imaging system, or on a media. In one embodiment, the first and second images are imaged on the same media one on top of the other. In another embodiment, they are imaged on separate media and physically overlaid to form the third image. In yet another embodiment, one of the images is stored in a memory, and the other image imaged on a media. The image imaged on a media is scanned or otherwise detected, and superimposed or combined in memory with the other image (for example by an "OR" operation). This combined third image can be displayed on a screen, imaged, or analyzed in memory. The examples just described refer to registration error as the detected imaging parameter.

The sensors can also be designed to detect magnification errors. Errors in magnification, for example due to a poorly calibrated imagesetter, or to media stretch, result in the unmasking of some pixels, and not others, when two the first and second images are combined. Modulating the sensor tiles with pseudorandom noise extends the range of such magnification error sensors.

In another embodiment, large magnification of position errors is achieved by creating tiles in which one tile is created with pseudorandom noise. A second tile is created that is the reverse of the first tile (i.e. on pixels are off, and off pixels are on). When a such a pseudorandom image is overlayed with its reverse, the result is a 100% black tint, since the reverse fills in all of the off pixels in the original image. Portions, also referred to as cells, of one or both of the original and reverse images are phase shifted along one or both axis, such that a position error causes that cell of the combined image to become dark if, for example, there is a position error between the first and second image. The cells of the image can each be phase shifted by different amounts (and along different axis), so that a particular imaging parameter state will cause one cell to become dark, and a different imaging parameter state will cause a different cell to become dark.

Referring to FIG. 8, a simplified embodiment of such an image 200 includes forty-nine portions or cells (CELL AA–CELL GG). Each cell in either the original or reverse image (or both) is phase shifted by a different amount so as to reflect a particular position error. The center cell (CELL DD) is not shifted at all (i.e. a shift of zero in the horizontal direction and a shift of zero in the vertical direction) so that the center cell (CELL DD) is dark (100% tint) when there is no position error in the combined image. The cell above the center cell (CELL CD) is shifted so that it will be dark when there is +1 pixel position error in the vertical direction, and no error in the horizontal direction. The cell to the right of the center cell (CELL DE) is shifted so that it will be dark when there is +1 pixel position error in the horizontal direction, and no error in the vertical direction. The cell in the bottom-leftmost corner (CELL GA) is shifted so that it will be dark when there is −3 pixels position error in the horizontal direction, and −3 pixels position error in the vertical direction. In one embodiment, all the cells in the image are shifted (including a shift by zero) to reflect different position error states.

When the two images are overlaid with no position error, the center cell (CELL DD) of the combined image appears dark. When the two images are overlaid with one pixel of position error in the vertical direction, the cell above the center cell (CELL CD) in the combined image appears dark. Thus, the one pixel error results in a visible display difference that is the size of a cell, which is a great magnification of the position error, since a cell is usually much larger than a pixel.

As shown in FIG. 8, the cells are square, but the shape or size of the portions is not a limitation on the invention. The cells can be any shape, or any number of pixels as long as it is not desired to have multiple cells of the same shape. Generally, cells shaped like regular polygons or circles have been shown to produce results that are aesthetically pleasing. The pixel shift does not need to be uniform from cell to cell, or uniform within a cell. In some embodiments, sub-portions of cells are shifted so as to draw multi-cell symbols or effects at particular imaging parameter states. In one embodiment, a cell includes several different sections of the master noise tile, each phase shifted by a different amount. This results in a cell becoming dark (100% tint) at a plurality of different registration errors.

Figure 9A:
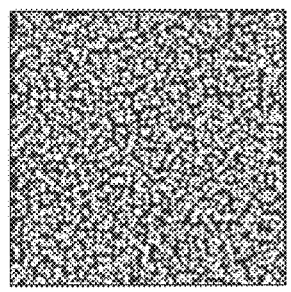
FIG. 9A depicts an embodiment of a first image of pseudorandom noise.
Figure 9B:
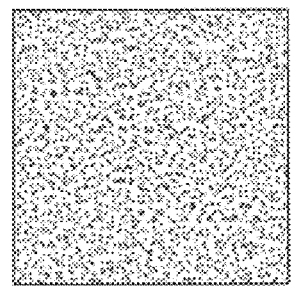
FIG. 9B depicts an embodiment of a second image formed by the reverse of FIG. 9A, and phase shifting various portions.

Referring to FIGS. 9A–9E, an embodiment of the example sensor includes two images, TILE A (FIG. 9) and TILE B (FIG. 9B). TILE A (FIG. 9A) is a 65% tint produced by high spatial frequency pseudorandom noise pattern. TILE A (FIG. 9A) is divided into 7×7 cells that represent the possible positions for an opaque dot that is visible to the human eye viewing the combined image. The sensor is designed so that for any given registration error within the sensor range only one cell is turned black. The position of the cell that is turned black depends on the magnitude of the position error. Each cell of TILE B (FIG. 9B) is the reverse of the corresponding cell in TILE A phase shifted by the amount of XY registration error designated to turn the given cell black. This is illustrated by the equation $B_{ij}=(1-A_{(i+\Delta X),(j+\Delta Y)})$, where $A_{i,j}$ and $B_{i,j}$ are binary bitmap patterns of cell (i,j) in TILE A and TILE B respectively. The values ΔX and ΔY are the x-axis (horizontal) and y-axis (vertical) integer pixel phase shift representing the registration error that will cause the cell (i,j) to be filled in.

The pattern components for these cells are random and sum as incoherent noise. The cells that are not filled in produce a uniform background tint composed of the combined transmission values of TILE A and TILE B. The pattern in each cell of TILE A is a 65% tint and the patterns in each cell of TILE B are 35% tint. When the two patterns are superimposed, the result is a 77% background tint. The 100% tint cell will readily appear over the 77% tint background. In practice, since actual registration error includes fractional pixel displacement, cells immediately adjacent to the "on" cell may darken to a tint value part way between the background level and 100% black, depending on the sensor design.

Figure 9C:
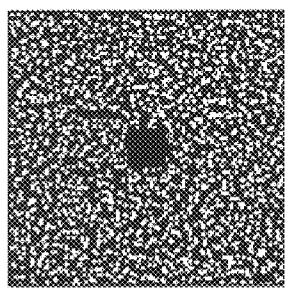
FIG. 9C depicts the sensor formed with FIGS. 9A and 9B in alignment.
Figure 9D:
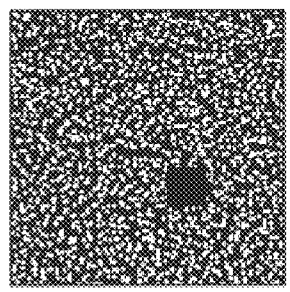
FIG. 9D depicts the sensor formed with FIGS. 9A and 9B with alignment error in the horizontal and vertical directions.
Figure 9E:
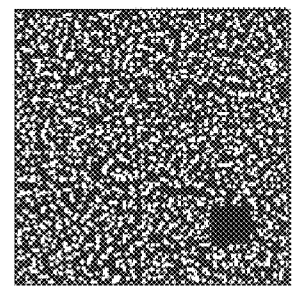
FIG. 9E depicts the sensor formed with FIGS. 9A and 9B with alignment error in the vertical and horizontal directions.

Referring to FIG. 9C, which shows the tile of FIG. 9A and the tile of FIG. 9B superimposed, the dark cell is clearly visible in the center, indicating that TILE A (FIG. 9A) and TILE B (FIG. 9B) are aligned. FIG. 9D shows TILE A (FIG. 9A) and TILE B (FIG. 9B) overlaid with some amount of registration error. FIG. 9E shows TILE A (FIG. 9A) and TILE B (FIG. 9B) with even greater registration error, as indicated by the distance of the darkened cell from the center. As described above, in the embodiment of FIGS. 9C–9E, the direction by which the dot is moved from the center indicates the direction of registration error as well as the amount.

The visual magnification factor for this sensor is determined by the dimensions of the cell and the phase shift step used to move the dot between two adjacent cell positions. This visual magnification is given by $M_x=w_x/G_x$, $M_y=w_y/G_y$ where $M_x$ and $M_y$ are the visual magnification factors for each axis, $w_x$ and $w_y$ are the cell dimensions, and Gx and Gy are the phase shift step sizes for each axis.

In one embodiment, the phase step size between adjacent cells is one pixel. The cell size is typically greater than 20 mil in order for the "dot" and its displacement to be clearly visible. Cell size is constrained by the overall tile size, the desired number of cells in an image, and the minimum size at which the dot would be visible against the chosen background tint. The minimum element size of the noise pattern must be large enough to be printable on the give media and writing engine, which is typically one or two pixels at maximum engine addressability. This defines the granularity of the noise pattern and its potential for visibility.

For example, a sensor designed for 3600 dpi addressability using a 200 pixel (55 mil) cell width and a phase step between adjacent cells of one pixel (0.28 mil) produces a 200:1 visual magnification factor. It provides a visual display with a position error resolution of 0.28 mil. This is higher magnification than the microscope in a typical coordinate measurement machine (CMM) tool used for copy scale error measurements. Since the error is recorded once-and-for-all directly on the media there are no intervening measurement error sources such as physical distortion of media due to handling, or copy mounting and vacuum pull down errors when using a CMM.

Generally the shape of the cell does not have to be square, nor does the phase error step size (gain) have to be constant for all the cells. The gain could be adjusted so that it is higher in the center and lower at the edges of the tile, so that the sensor is more sensitive in the middle, and less sensitive at the edges. This increases the operating range over which a dot will be produced while maintaining high magnification as the error approaches zero (center of tile).

In one embodiment, cells are grouped together to form different alphanumerical characters or symbols at designated XY error positions. In this case the size of the cell can be relatively smaller, since only the larger character or symbol is resolved. Thus the function of a digital position sensor could be provided that produces a direct digital readout of microscopic position errors. Here the significant design trade-off is that each cell may have to be filled-in at multiple phase error states which effectively increases the size of the randomized dots in pattern 'B'. As a result the background tint level becomes higher when the tiles are superimposed. This compromises the contrast visibility of the sensor as well as its printability as the background tint level approaches 95%. This condition may be avoided by making the overall tile larger to separate the symbols and/or by reducing the number of cells grouped to form a symbol.

In some embodiments, it can be useful to identify groupings of ON and OFF pixels, and enlarge the groupings. This effectively adjusts the duty cycle of the image, which can be helpful in designing effective sensors. The duty cycle can be adjusted in either direction (i.e. X or Y axis) with this technique.

In some embodiments, an array of sensors is constructed, with each sensor responding to a different imaging parameter state. Such an array can be used to identify a particular parameter value, and avoids the problems associated with sensors that include symbols that appear at various imaging parameter states.

The embodiments described herein are described as for use on high resolution negative imagesetter film which produces a black image when the laser is turned ON. The sense of the bitmap patterns could be changed to produce a white dot on a light tint background with positive media. Also the patterns can be adjusted to accommodate lower addressability writing engines or lower resolution media. Additional effects can be produced on media that is not fully opaque when exposed, such as press inks. However, using tiles of two different colors presents the challenge of producing a background tint that is uniform in both density and color with a visible dot on it. This challenge is not insurmountable, and images constructed with color pixels are within the scope of the invention.

Not all image quality measurement tasks require 100× magnification. Many require only 10×–20× magnification— the gain of an eye loupe. This significantly relaxes the design constraints.

In some embodiments, it is useful to provide position reference marks within the sensor. In one embodiment, such a position reference mark is used to indicate a pass/fail tolerance zone. Such reference symbols are not only visible but do not interfere with the visibility of the other features of the sensor.

Figure 10A:
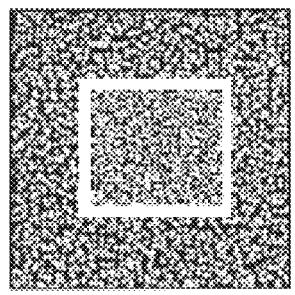
FIG. 10A depicts an embodiment of a first image generated with pseudorandom noise and including reference lines.
Figure 10B:
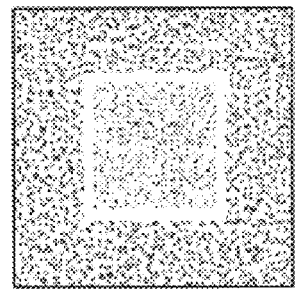
FIG. 10B depicts an embodiment of a second image formed by the reverse of the image of FIG. 10A, phase shifting various portions, and also including reference lines.
Figure 10C:
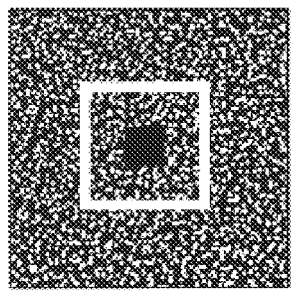
FIG. 10C depicts an embodiment of a sensor formed with reference lines with no alignment error.
Figure 10D:
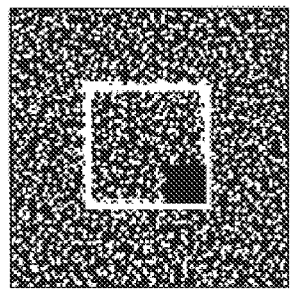
FIG. 10D depicts an embodiment of a sensor formed with reference lines with an acceptable amount of alignment error in the vertical and horizontal directions.
Figure 10E:
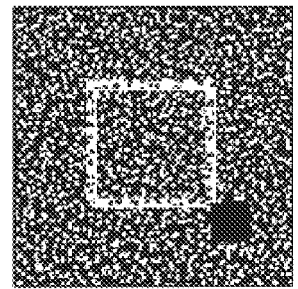
FIG. 10E depicts an embodiment of a sensor formed with reference lines with an unacceptable amount of alignment error in the vertical and horizontal directions.

Referring to FIGS. 10A–10E, an embodiment of a sensor includes a rectangular box embedded to indicate the specification limit for registration error. The box outline is generated by a zero tint line in both of the two overlaid images, as shown in FIG. 10A and FIG. 10B. Because the box symbol is relatively large, its line width can be smaller than the cell width and still be clearly visible. As a result the reference lines that form the box do not interfere with the visibility of the dots. Referring to FIG. 10C, the dark cell is clearly in the center of the box, indicating that the two images are aligned. FIG. 10D shows an acceptable amount registration error, indicated by the darkened tile being located within the box. FIG. 10E shows even greater registration error, as indicated by the distance of the darkened cell from the center.

It can also be useful to place a sensor adjacent to a visual reference that shows how the sensor will appear. The reference is generally design to be insensitive to the imaging parameter. For example, referring to FIG. 10C, and image that showed a black do in the center of the reference lines could be placed next to the sensor of FIGS. 10C–10E. Such a reference can be compared to the actual result. This helps a viewer to understand what the image should look like.

The XY position sensor described is highly process tolerant. The sensor is tolerant of processing variations such as development and media differences that result in, for example linewidth variations due to exposure differences that effect both tiles. As a specific example, linewidth variations of up to 1.5:1 have been tested without interfering with the visual performance of the sensor other than to change the overall tint level. The sensor is also tolerant of system resolution changes since high magnification can be achieved without using maximum available resolution.

It should be noted that while this discussion has focused on the use of two overlaid images, that is not a limitation. It should be clear that sensors can be designed with three or more overlaid images with similar results.

Figure 11:
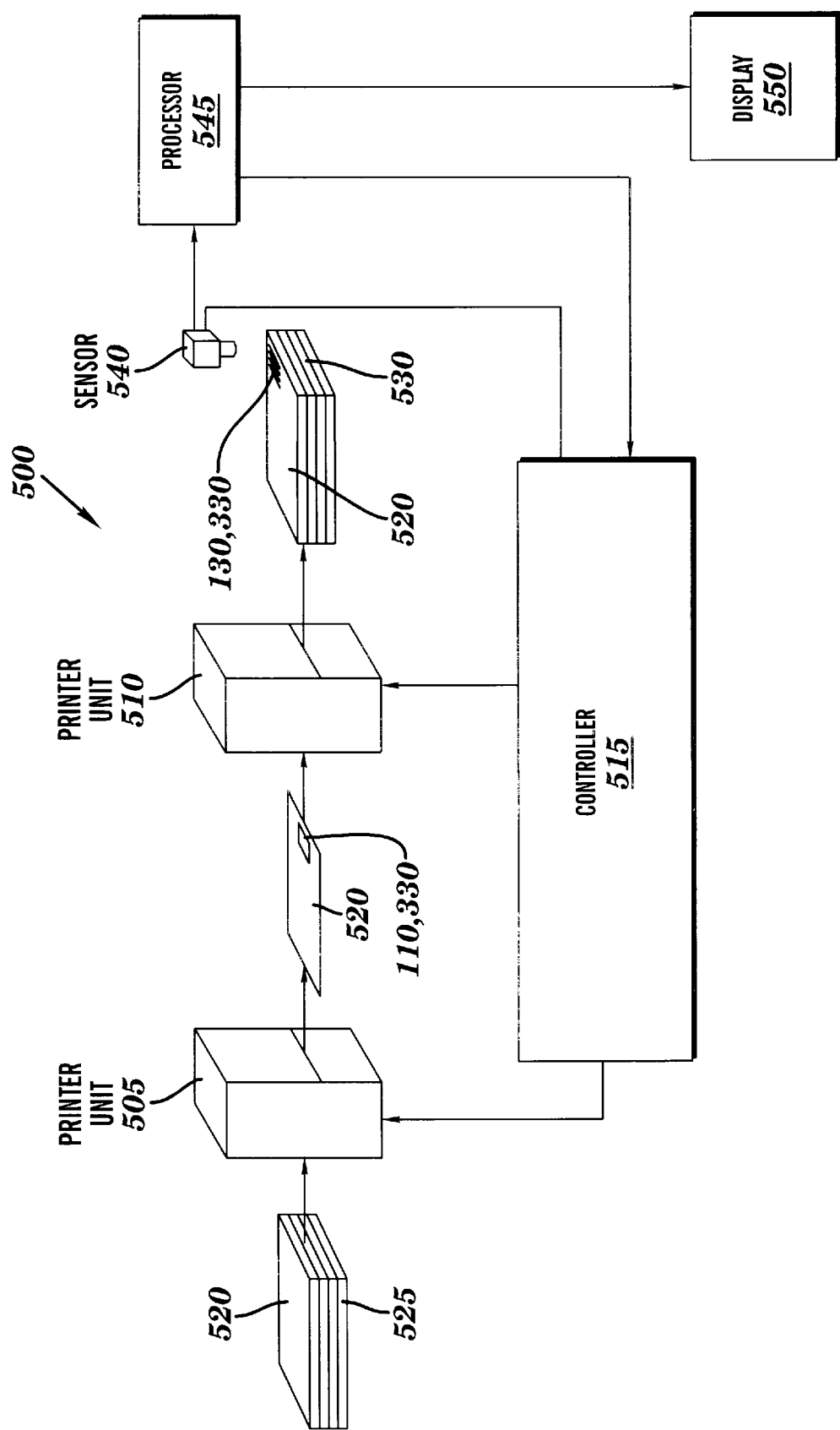
FIG. 11 depicts an embodiment of a system for implementing imaging parameter detection in accordance with the present invention.

FIG. 11 shows a system 500 for implementing the above-described technique. As depicted, the system 500 includes a first printer unit 505 and a second printer unit 510, both of which are controlled by the controller 515. Individual sheets of media 520 from the stack of media 525 are fed sequentially through printer units 505 and 510. The sheets exit the second printer unit 510 onto the media stack 530. Each of the printer units 505 and 510 include a cylindrical drum (not shown) into which the individual sheets of media 520 are drawn and mounted prior to imaging.

Figure 12:
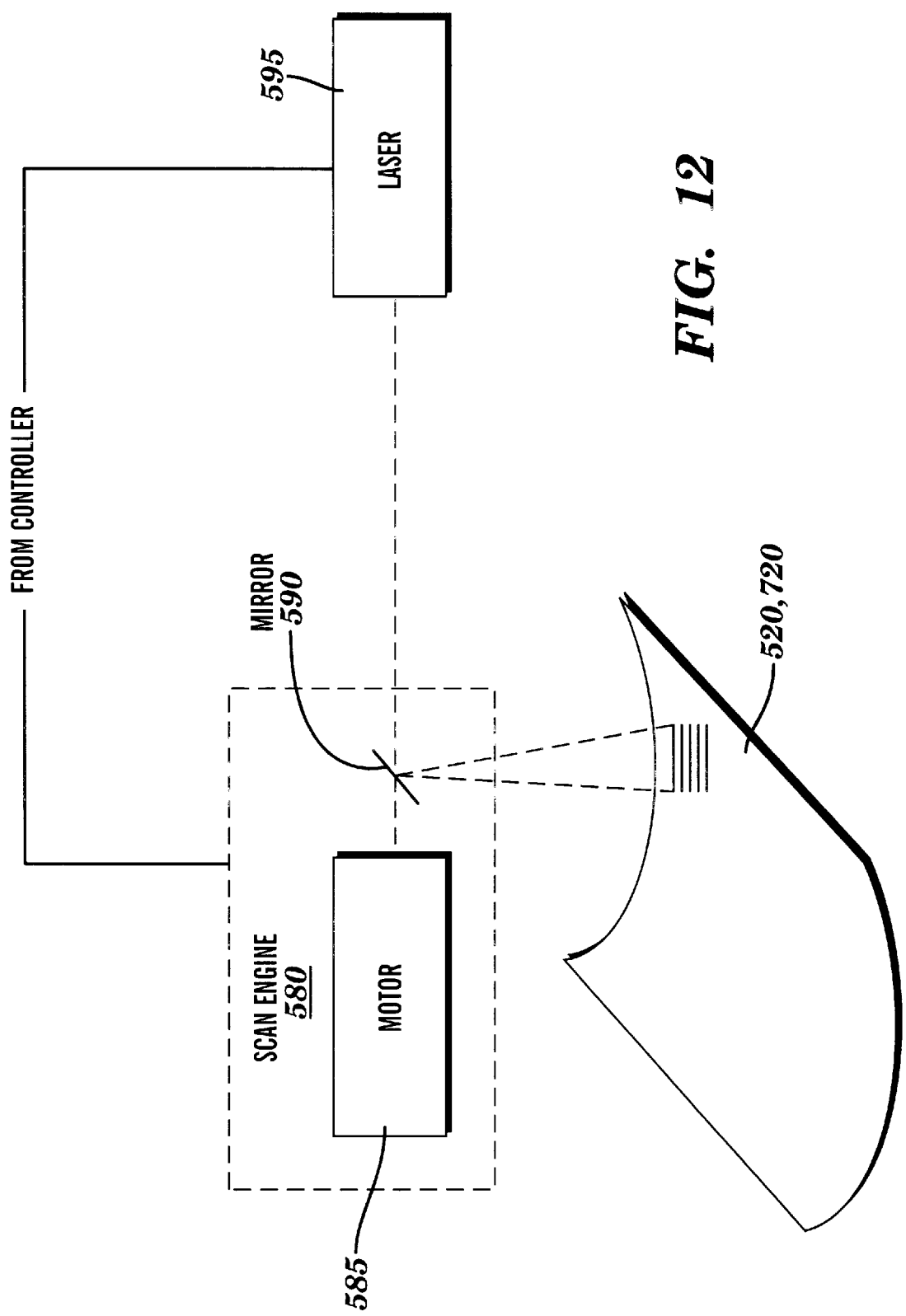
FIG. 12 depicts an embodiment of a prepress scanner housed within the printer units of FIG. 11.

As shown in FIG. 12, if the printer units 505 and 510 are part of a prepress system, each will house a scan engine 580 which includes a motor 585 which drives the spin mirror 590 or other spun deflector element during imaging operations. Each of the printer units 505 and 510 will also include a laser 595 or other radiation source for emitting a beam of radiation to impinge upon the spin mirror 590 and be reflected thereby so as to scan across the medium 520 mounted within the cylindrical drum (not shown). Although a cylindrical drum type system is depicted, it will be recognized that the technique is equally applicable to prepress imaging systems in which the medium to be recorded or read is mounted on a flat surface.

Figure 13:
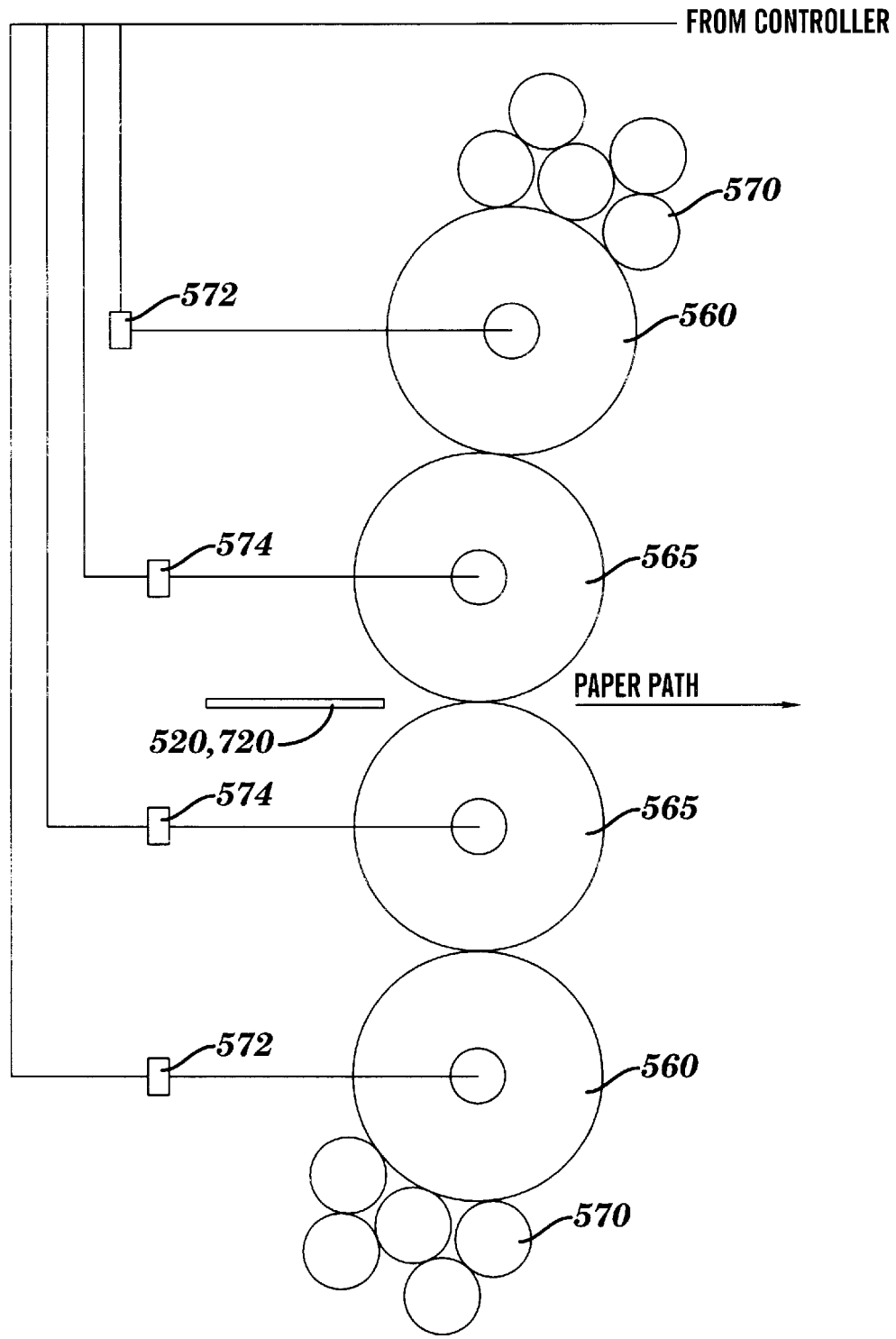
FIG. 13 depicts an embodiment of offset printer components alternatively housed within the printer units of FIG. 11.

As shown in FIG. 13, if the printer units 505 and 510 are part of a lithographic or offset printing system, each will house plate cylinders 560 and blanket cylinders 565 for transferring images onto the media 520 or 720 passing along a path which is indicated in FIG. 12 as a paper path. The plate cylinders will be respectively inked by inking systems 570. Each of the cylinders is driven by the drive devices 572 for the plate cylinders and 574 for the blanket cylinders 565. The drive devices are controlled by the controller 515 depicted in FIG. 11.

Referring again to FIG. 11, the system 500 also includes a sensor assembly 540 which could be a camera, photodetector, CCD or other type imaging device suitable for reading a respective first images 110, such as the image shown in FIG. 4A or FIG. 7A, and a second image 120, such as the image shown in FIG. 4B or FIG. 7B, or the combined image 130, such as the images shown in FIGS. 4C–4I or in FIGS. 7C–7I, as applicable. Of course, other patterns or marks could be formed.

In the system 500, the sensor assembly 540 includes a camera. The sensor assembly 540 is connected to a processor 545 which receives the digitized output signals from the sensor assembly 540. The processor 545 is programmed to process the received digitized signal and generate output signals to the display 550 for viewing by a system operator and/or to the controller 515 for controlling the printer units 505 and 510, and specifically, the scan engine 580 or rollers 560, 565, to form the patterns in the desired position on the individual sheets of media 520 as they pass through the printers 505 and 510.

In operation, individual sheets of the media 520 are drawn from the media stack 525 into print unit 505. In the case of prepress operations, the controller 515 controls the scan engine 580 of print unit 505 such that the spin mirror 590 is driven by the motor 585 to direct the radiation beam from the laser 595, which is also controlled by signals from the controller 515, to scan the medium 520 to create the first image on the medium 520. The medium 520 is then passed to the printer unit 510 which is driven by the controller 515 such that its scan engine 580 and laser 595 are operated to scan the radiation beam emitted from its laser 595 to form a second image superpositioned on the first pattern on the medium 520.

In the case of offset printing, the controller 515 controls the drive devices 572, 574 to control the operation of the rollers 560, 565 to form the first image on the medium 520. The medium 520 is then passed to the printer unit 510 which is driven by the controller 515 such that the devices 572, 574 are operated to drive the rollers 560, 565 rotate to form the second image superimposed on the first image on the medium 520.

The medium 520 exits the printer unit 510 onto the media stack 530 with the registration mark 30 formed thereon. The sensor assembly 540 is controlled by the controller 515 to image the register mark 30 on sheet 520 and generate a digitized output signal representing the registration mark 30 which is transmitted to the processor 545.

The processor 545 processes the signal received from the sensor assembly 540 and generates an output signal to the display 550. The display 550 provides a picture of the registration mark 30 on its screen for viewing by the system operator. The processor 545 also transmits an output signal to the controller 515 to indicate either satisfactory alignment of the images 110 and 120 forming the combined image 130 or a misalignment error in the images 110 and 120 exceeding a predefined tolerance. In this latter case, the controller 515 either automatically directs an adjustment in the operation of one or both of printer units 505 and 510, or directs the printer units to cease printing operations if adjustment will not correct the error. It will be understood by those skilled in the art that in offset printing type operations, the registration mark will typically be used on a real time basis to continually monitor the printed media during production operations. However, in prepress operations, the registration mark is more likely to be used in a setup stage prior to a production run and in diagnostic testing either during installation or servicing of the printer units. Accordingly, continuous tracking, although available if desired, will normally not be utilized in prepress operations.

If desired, the transmission of the feedback control signals to the controller 515 and/or the transmission of output signals to the display 550 could be eliminated. If signals are not transmitted to the controller 515, the system operator would be responsible for directing adjustments or shutting down the system if the displayed registration mark indicates a misalignment error exceeding the predetermined error tolerance. If signals to the display 550 are eliminated, the controller 515 would be relied upon to automatically direct adjustments to the operation of the print units to correct the misalignment error or to shut down printing operations if unacceptable and uncorrectable misalignments are detected by the sensor assembly 540.

In this latter case, the sensor assembly 540 could be configured to detect only the density of the combined image 130 and the processor 545 might include a comparator circuit or lookup table to determine whether the sensed density is no greater than a threshold density reflecting alignment of the images 110 and 120 within the acceptance threshold. Alternatively, the sensor assembly 540 could be configured to detect a symbol, if exposed. to determine if misalignment of the images exceeds the position error tolerance. Even if the display is eliminated, the system operator may view the combined images 130 as the medium 520 is placed on the media stack 530 to determine with an unaided eye whether or not the symbol has been exposed. In this way, the system operator can verify either an unacceptable misalignment of the images 110 and 120, or that the patterns are properly aligned.

Figure 14:
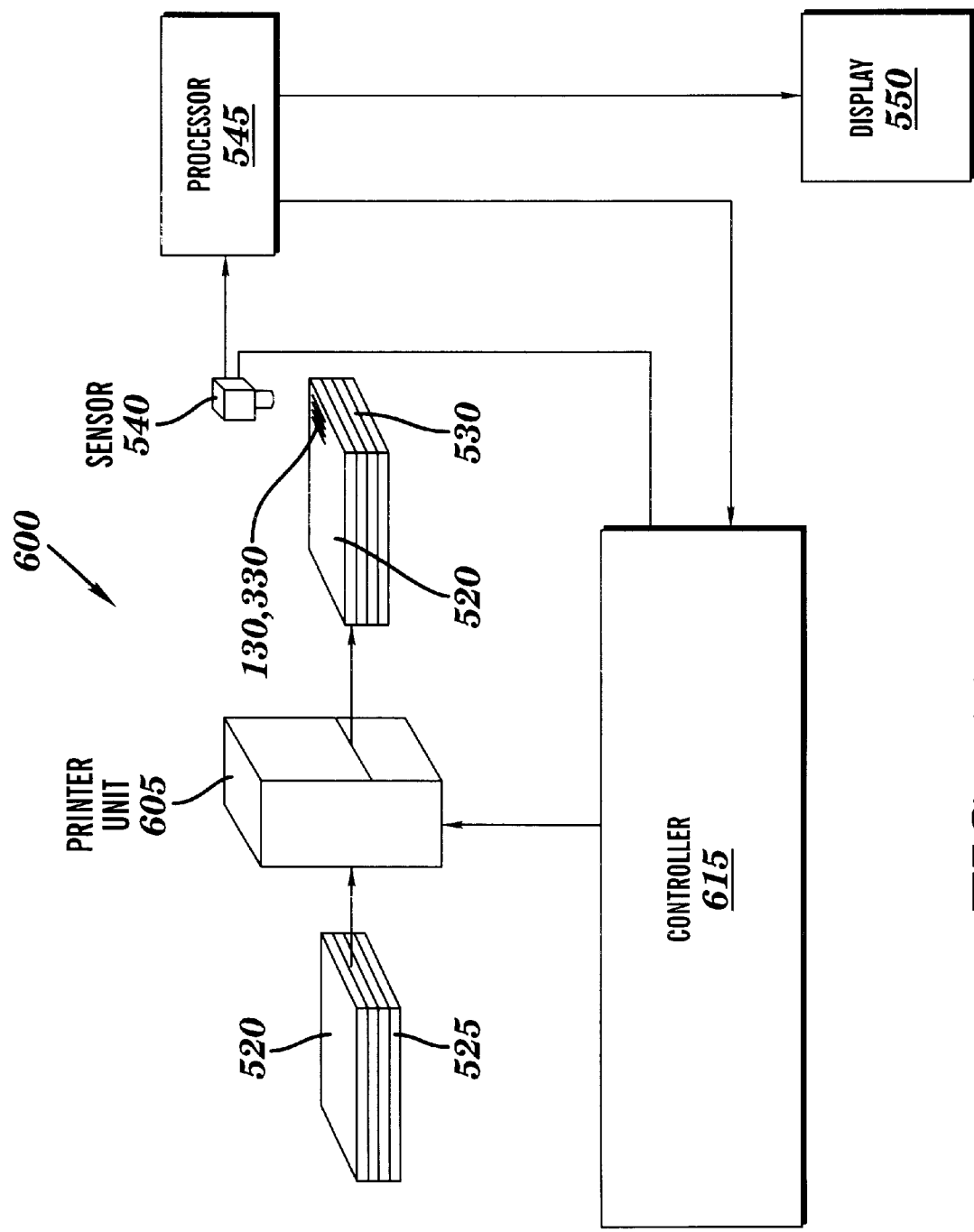
FIG. 14 depicts another embodiment of a system for implementing imaging parameter detection in accordance with the present invention.

FIG. 14 depicts a further system 600 suitable for implementing the above described technique. As shown, the system 600 includes a single printer unit 605 which is substantially similar to the respective units 505 and 510. The printer unit 605 may include a radiation beam source and scan engine as depicted in FIG. 12, or rollers and inking systems as depicted in FIG. 13. The sensor assembly 540, processor 545 and display 550 are identical to those previously described with reference to FIG. 11 and accordingly, are identified with the same reference numerals.

In this particular implementation, the printer unit 605 is driven by the controller 615 such that the printer unit 605 is driven to form both images 110 and 120 on the medium 520. More particularly, the printer unit 605 is driven to first form a first image 110, such as shown in FIG. 4A or FIG. 7A, on the medium 520. The controller also drives the printer unit 605 to superposition a second image 120, such as the image shown in FIG. 4B or FIG. 7B on the first image 110, to create a combined image as, for example, shown in FIGS. 4C–4F and 7C–7F. Accordingly, only a single scanner is required to form the combined image on the medium.

Figure 15:
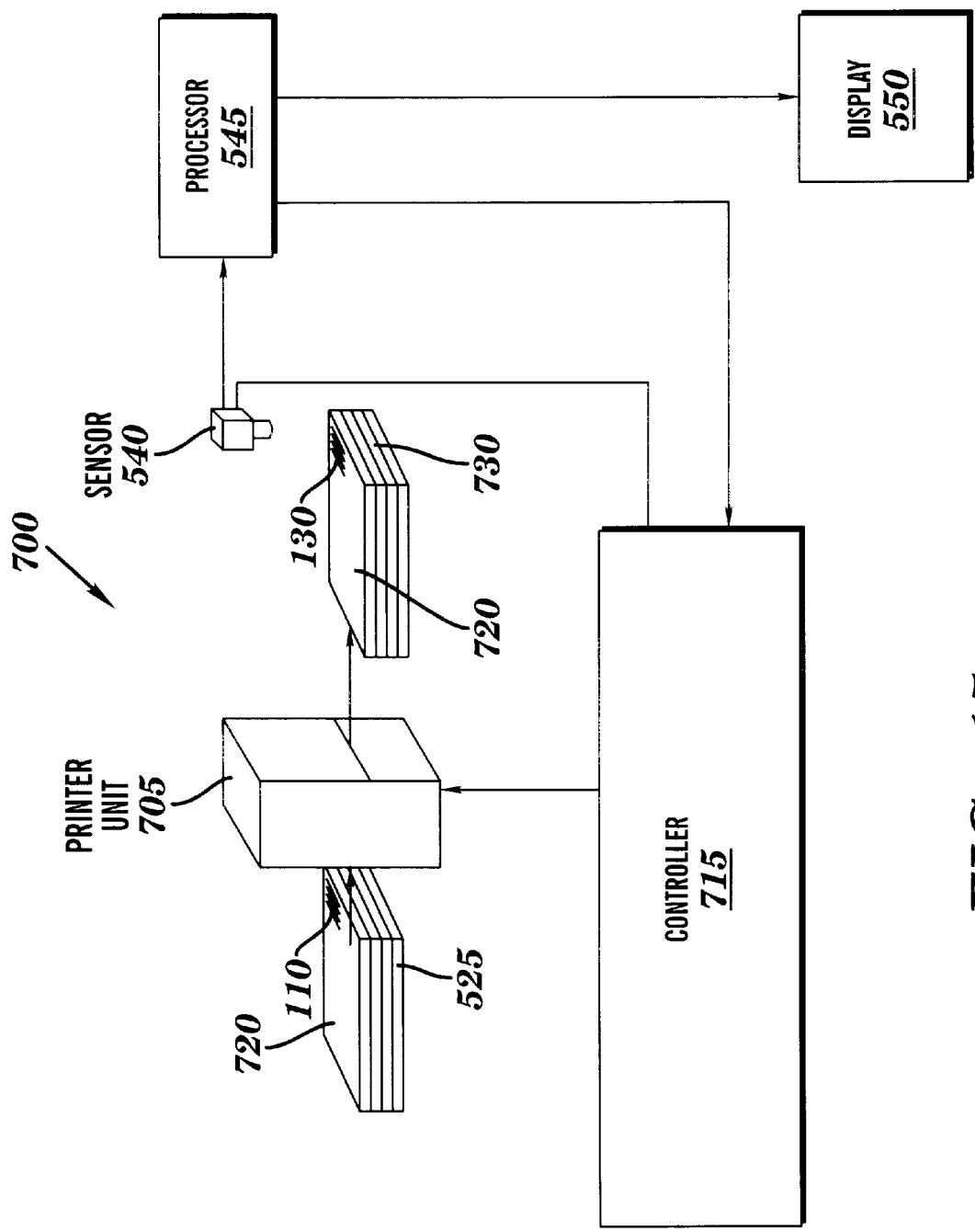
FIG. 15 depicts another embodiment of a system for implementing imaging parameter detection in accordance with the present invention.

FIG. 15 depicts another system 700 suitable for implementing the above described technique. The sensor assembly 540, processor 545 and display 550 are identical to those previously described. The system 700 differs from the system 600 in that the media 720 include a pattern 110 which is preprinted thereon prior to being placed in stack 725. The medium 720 is drawn into the printer unit 705 which is similar to the previously described printer units and includes a scan engine 580 and laser 595, as depicted in FIG. 12, or the rollers 560, 565 and inking systems 570 shown in FIG. 13. Because of the preprinting of the pattern 110 on the respective sheets of media, the controller 715 drives the printer unit 705 to write only one image superpositioned over a preprinted image on medium 720 to create a combined image which is sensed by the sensor assembly 540. The feedback control and display functions are identical to those previously described and accordingly will not be reiterated to avoid unnecessary duplication.

Figure 16:
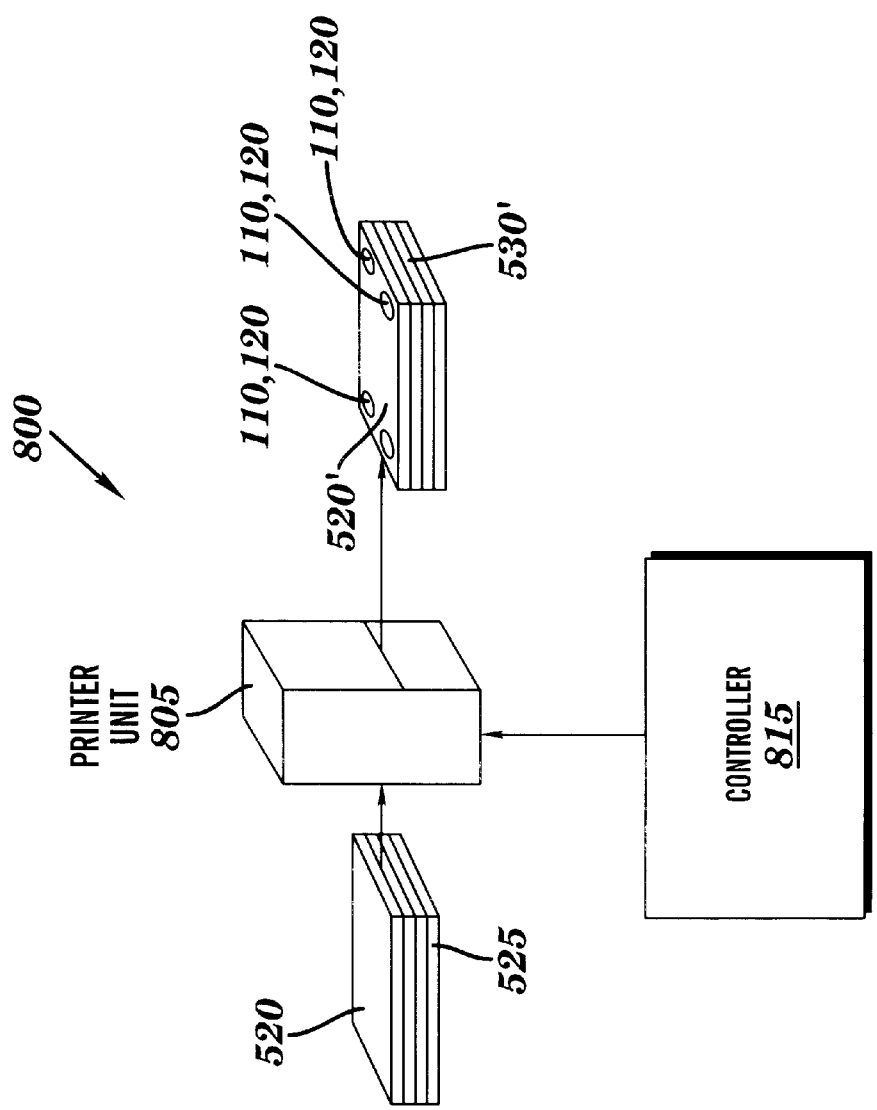
FIG. 16 depicts an embodiment of a simplified system for implementing imaging parameter detection in accordance with the present invention.

Turning now to FIG. 16, yet another system 800 suitable for implementing the above described technique is depicted.

The system 800 includes a printer unit 805 which is substantially similar to the previously described printer units and includes a scan engine 580 and laser 595 as depicted in FIG. 12 or rollers 560, 565 and inking system 570 of FIG. 13.

The printer unit 805 is controlled by the controller 815. Individual sheets of media 520 are drawn from the media stack 525 into the printer unit 805. The printer unit 805 is driven by the controller 815 to form a first image 110 such as the image of FIG. 4A or FIG. 7A and a second image 120 such as the image of FIG. 4B and FIG. 7B respectively on every other sheet 520 drawn from the media stack 525 into the printer unit 805.

Each sheet of medium 520 exiting the printer unit 805 onto media stack 530' will have either the first image 110 or the second image 120 written thereon. Medium 520 depicted in FIG. 16 must necessarily be transparent so that the physical overlaying of individual sheets of media 520 superpositions second image 120 over first image 110 to create a combined image 130 which is visible to the system operator.

Figure 17:
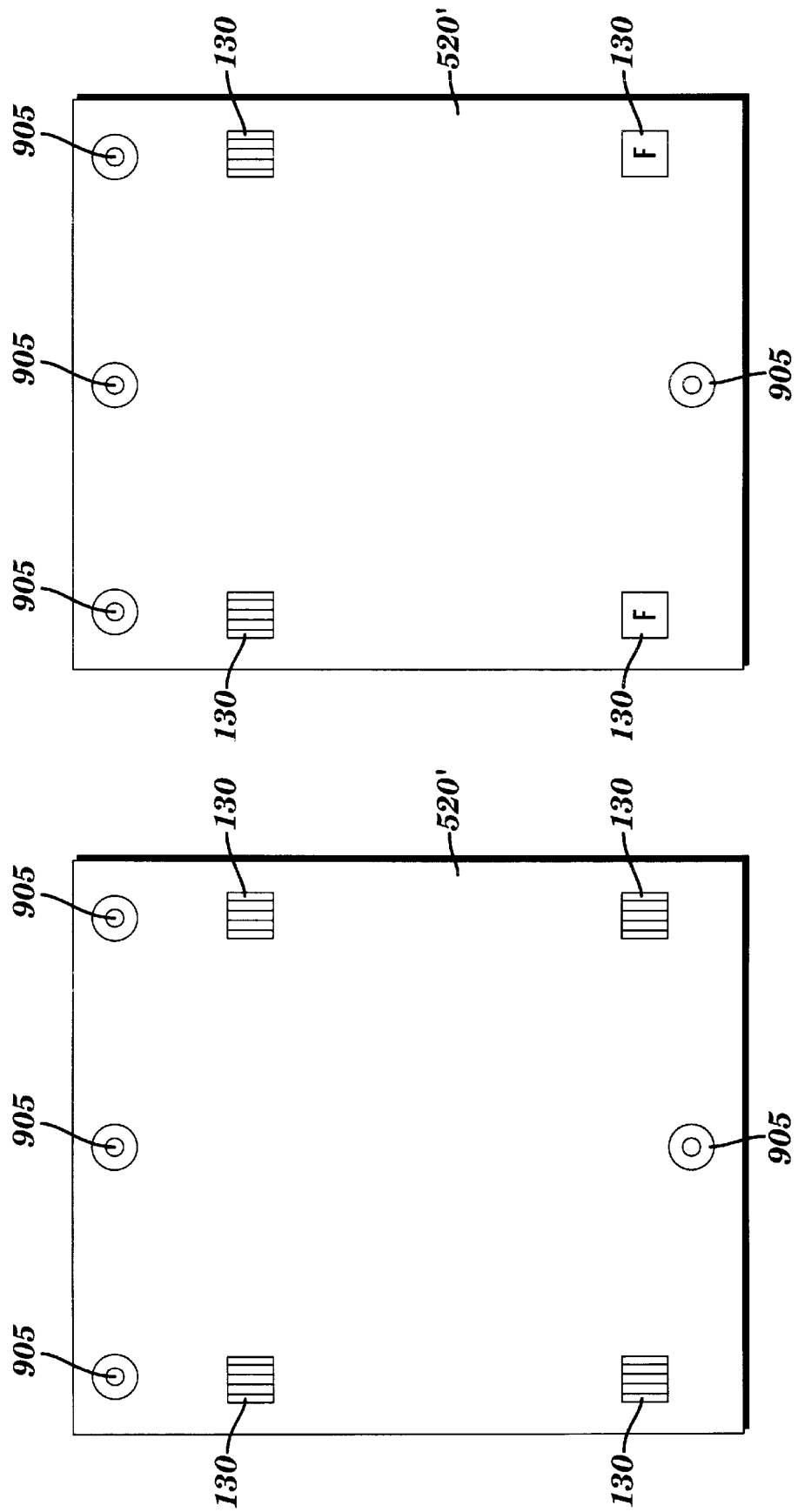
FIG. 17A depicts the creation of a combined image which indicate acceptable repeatability by physically overlaying individual sheets of media with different images imaged thereon.
FIG. 17B depicts the creation of a combined image which indicate unacceptable repeatability by physically overlaying individual sheets of media with different images imaged thereon.

Referring to FIGS. 17A and 17B, the paired sheets of media 520' exiting the printer unit 805 are overlaid and aligned to create a third image 130. As shown in FIG. 17A, the two sheets of media 520' are overlaid and aligned by a set of precise registration pins 905, thereby creating the third image 130 in the four corners of the sheet pair. It will be understood that the top sheet 520' could include either of a first image 110 or second image 120 so long as the bottom sheet has the other image written thereon. In FIG. 17A, the embedded symbol in the pattern is not exposed in any of the registration marks. Accordingly, by viewing the sheet pair depicted in FIG. 17A, the system operator can visibly confirm with an unaided eye that the alignment of the images are within tolerance and the repeatability of the printer unit 805 is satisfactory.

FIG. 17B also depicts four combined images 130 created by overlaying and aligning an associated pair of sheets of media 520'. As shown, the symbol embedded in images is not exposed in the upper two combined images 130. However, the embedded symbol "F" is exposed in the lower two combined images 130. Accordingly, by visually inspecting the overlaid sheets 520', the system operator is provided with a visible indication that the misalignment of the patterns is outside of the required threshold and that the repeatability of the printer unit 805 is unacceptable.

Figure 18:
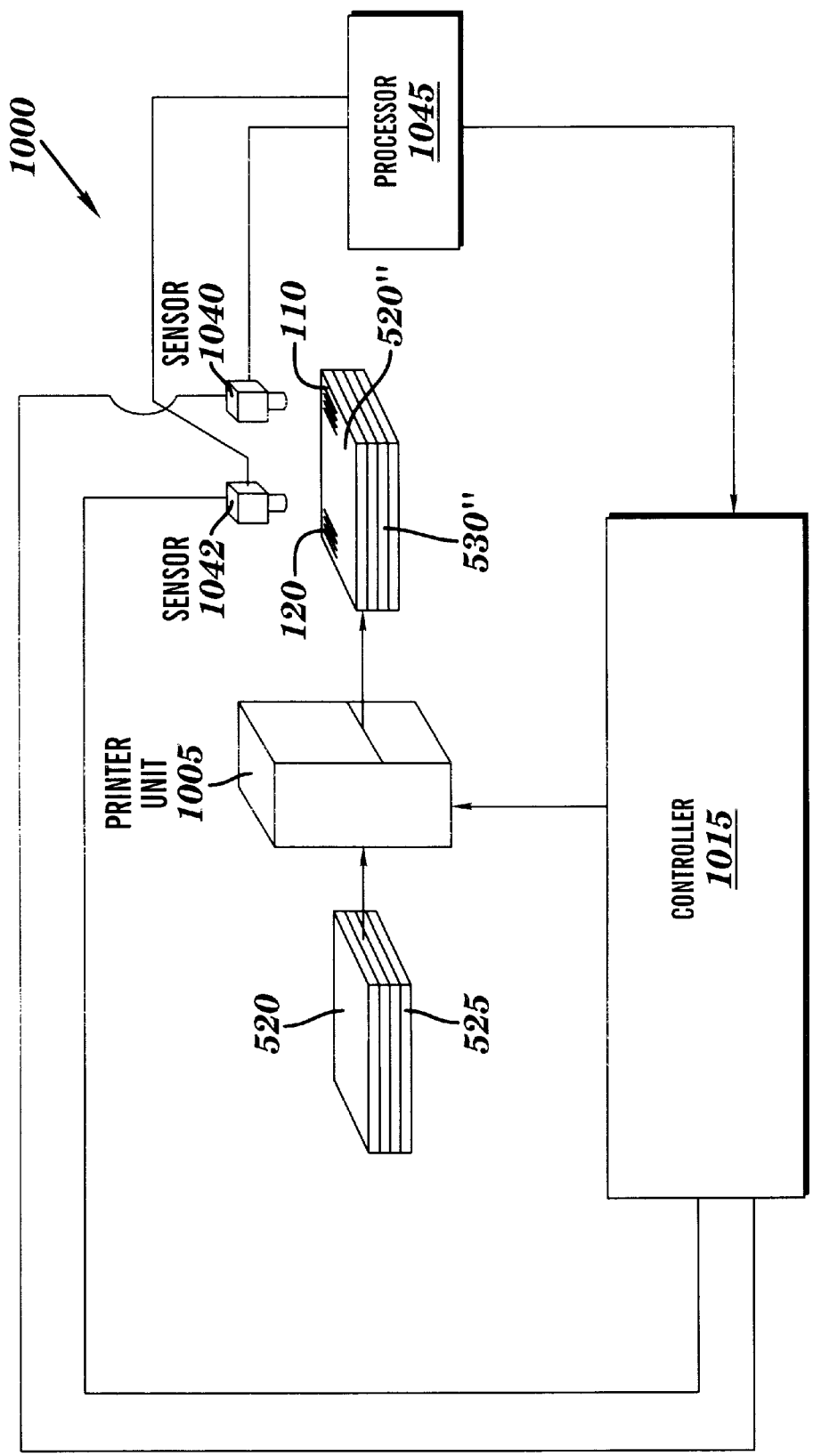
FIG. 18 depicts another embodiment of a system for implementing imaging parameter detection in accordance with the present invention.

FIG. 18 depicts yet another system 1000 suitable for implementing the above described technique. The system includes a printer unit 1005 which is substantially similar to the previously described printer units and includes a scan engine 580 and laser 595, as depicted in FIG. 12 or rollers 560, 565 and inking system 570 of FIG. 13. Individual sheets of media 520 are fed into the printing unit 1005 from the media stack 525. The printer unit 1005 is driven by the controller 1015 to form a first image 110, in one corner of the sheet 520 and a second image 120 in another corner of the sheet 520. The sheet 520" with images 110 and 120 separately written thereon exit the printing unit 1005 onto the media stack 530".

Respective sensor assemblies 1040 and 1042 read the respective images 110 and 120 from the media sheet 520" and respectively transmit digitized signals representing images 110 and 120 to the processor 1045. The processor 1045 processes the received signals to form an electronic representation of a registration mark 130 corresponding to the superpositioning of the patterns 110 and 120. The processor 1045 also determines whether or not the symbol embedded in the images 110, 120 is exposed in the combined image 130 or if the density of the combined image 130 is indicative of a misalignment exceeding a given tolerance.

The processor 1045 generates an output signal to the controller 1015 indicating either satisfactory or unsatisfactory repeatability of the printer unit 1005. In the latter case, the controller 1015 either directs the printer unit 1005 to adjust the scan engine 580 or rollers 560, 565 operation or to cease further printing operations. As in other implementations, the controller also controls the operation of the sensor assemblies 1040 and 1045.

Variations, modifications, and other implementations of what is described herein will occur to those of ordinary skill in the art without departing from the spirit and the scope of the invention as claimed.

For example, sensors sensitive to geometric error, as discussed herein, can be used to measure various imaging parameters including magnification, straightness, orthogonality, length measurement, media stretch, media shrinkage, focus measurement, spot size distortion, spot shape distortion, banding, and linearity, to name a few, but the invention is not intended to be limited to these particular imaging parameters. Sensors can also be designed that are sensitive to a subsequent process step, for example by incorporating the transfer function of the process step into the design of the tiles. The transfer function could take the form of modification of the density or spatial characteristics of one or all component tiles. For example, just as a sensor sensitive to geometric error can be used to detect media shrinkage that occurs during development of the media, sensors can include a transfer function that will show other processing parameters. The sensors can also be used to directly show a variable that is otherwise not measurable. For example, a sensor could be used as the detector in an iterative process where perturbations are intentionally applied to a system for purposes of measuring system response to the perturbation. An example would be to measure the tolerance of a printing system to vibration input using a visual sensor that a direct calibration response on the media. Eliminating the coherence of a fine pitch line mask improves the visual performance of the sensor pair under conditions which produce a parallax effect—such as observing two emulsion layers sandwiched between a 4 mil polyester base.

Accordingly, the invention is to be defined not by the preceding illustrative description but instead by the spirit and scope of the following claims.

What is claimed is:

1. A method for visibly detecting an imaging parameter by superimposing two images, comprising the steps of:
   (a) forming a first image generated using pseudorandom noise; and
   (b) forming a second image generated using the same pseudorandom noise, the first and second images forming a third image that visibly displays the state of an imaging parameter when the first image and second image are superimposed.

2. The method of claim 1, wherein step (a) comprises forming the first image in a memory.

3. The method of claim 1, wherein step (a) comprises forming the first image on a media by imaging on the media.

4. The method of claim 1, wherein step (b) comprises forming the second image in a memory.

5. The method of claim 1, wherein step (b) comprises forming the second image on a media by imaging on the media.

6. The method of claim 1, further comprising the step of:
   (c) superimposing the first image and the second image, thereby displaying the third image.

7. The method of claim 6 wherein step (c) comprises the steps of:
   (i) imaging one of the first and second images on a transparent first media;

(ii) imaging the other of the first and second images on a second media; and (iii) overlaying the first media on the second media.

8. The method claim 1 wherein step (a) comprises forming the first image on a media, step (b) comprises forming the second image on the same media overlaid on the first image, thereby superimposing the first image and the second image on the media.

9. The method of claim 1 wherein step (a) comprises forming the first image in a memory, step (b) comprises forming the second image on a media, and further comprising the steps of:

(c) detecting the second image formed on the media; and (d) combining the first image and detected second image in memory, thereby superimposing the first image and second image in memory.

10. The method of claim 1 wherein step (a) comprises forming the first image on a media, step (b) comprises forming the second image in a memory, and further comprising the steps of:

(c) detecting the first image formed on the media; and (d) combining the first image and detected second image in memory, thereby superimposing the first image and second image in memory.

11. The method of claim 1 wherein the state of the imaging parameter comprises an amount of geometric error.

12. The method of claim 11 wherein the state of the imaging parameter comprises an amount at least one geometric error chosen from the set of registration error, magnification, straightness, orthogonality, length measurement, media stretch, media shrinkage, focus measurement, spot size distortion, spot shape distortion, banding, and linearity.

13. The method of claim 1 wherein the state of the imaging parameter comprises an amount of registration error.

14. The method of claim 1, wherein:

step (a) comprises forming a first image comprising a first repetitive pattern modulated with pseudorandom noise; and step (b) comprises forming a second image comprising a second repetitive pattern modulated with the same pseudorandom noise.

15. The method of claim 14 wherein:

step (a) comprises forming a first image comprising a first repetitive pattern modulated with a uniform pseudorandom noise distribution.

16. The method of claim 14 wherein:

step (a) comprises forming a first image comprising a first repetitive pattern modulated with a gaussian pseudorandom noise distribution.

17. The method of claim 1, wherein:

step (a) comprises forming a first pseudorandom image; and step (b) comprises:

(i) deriving a second image from the first image; and (ii) forming the second image.

18. The method of claim 17 wherein step (b)(i) comprises, for each of at least one cells in the second image, the steps of:

(A) forming a reverse image of the corresponding cell in the first image; and (B) phase shifting one or both of:

(1) at least a portion of the cell in the second image;

(2) at least a portion of the corresponding cell in the first image.

19. The method of claim 18 wherein (b)(i)(B) comprises phase shifting by the amount of imaging parameter state designated for display.

20. The method of claim 19 wherein step (b)(i)(B) comprises phase shifting a different amount in the X axis and the Y axis.

21. The method of claim 17 wherein the number of superimposed components is greater in one of the X and Y direction than in the other of the X and Y direction.

22. The method of claim 17 wherein the mean pitch of the image is different in the X direction and the Y direction.

23. The method of claim 17 wherein the coarseness of the image is different in the X and Y directions.

24. The method of claim 18 further comprising, after step A, the steps of:

identifying a grouping of on pixels or a grouping of off pixels; and enlarging the identified pixel grouping.

25. A system for displaying an imaging parameter, comprising:

a print device configured to form images on media;

a controller in communication with said print device the controller controlling said print device to form a first image generated with pseudorandom noise and to form a second image generated with pseudorandom noise, the first and second images forming a third image that visibly displays the state of an imaging parameter when the first image and the second image are superimposed.

26. The system of claim 25, wherein the controller is operable to form the first image on a media and to form the second image overlayed on the first image on the same media.

27. The system of claim 26, wherein the controller is operable to form the first image on a first media and the second image in a corresponding location on a second media.

28. The system of claim 25 further comprising a memory device configured to store images; and an image detector to detect images formed on media;

wherein the controller is operable to form one of the first and second images in the memory device, and to drive said print device to form the other of said first and second images on a media;

said wherein said controller is operable to drive said image detector to detect said other of said first and second images on said media, and to combine in memory the one of the first and second images and the detected other of the first and second images.

29. The system of 25 wherein said imaging parameter comprises a geometric error.

30. The system of claim 25 wherein said imaging parameter comprises at least one geometric error chosen from the set of registration error, magnification, straightness, orthogonality, length measurement, media stretch, media shrinkage, focus measurement, spot size distortion, spot shape distortion, banding, and linearity.

31. The system of claim 25, wherein the controller is operable to drive the print device to form a first image comprising a first repetitive pattern modulated with pseudorandom noise and to form a second image comprising a second repetitive pattern modulated with pseudorandom noise.

32. The system of claim 25, wherein the controller is operable to drive said print device to form a first pseudorandom image, and to form a second image derived from the first pseudorandom image.

* * * * *